United States Patent
Lee et al.

(10) Patent No.: US 11,223,229 B2
(45) Date of Patent: Jan. 11, 2022

(54) UNINTERRUPTIBLE POWER SUPPLY SYSTEM COMPRISING ENERGY STORAGE SYSTEM

(71) Applicant: LSIS CO., LTD., Anyang-si (KR)

(72) Inventors: Ji-Heon Lee, Anyang-si (KR); Dong-Jin Yun, Anyang-si (KR); Ji-Hong Kim, Anyang-si (KR); Yun-Jae Lee, Anyang-si (KR); Min-Jae Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 282 days.

(21) Appl. No.: 16/486,374

(22) PCT Filed: Aug. 24, 2017

(86) PCT No.: PCT/KR2017/009274
§ 371 (c)(1),
(2) Date: Aug. 15, 2019

(87) PCT Pub. No.: WO2018/159910
PCT Pub. Date: Sep. 7, 2018

(65) Prior Publication Data
US 2021/0194275 A1      Jun. 24, 2021

(30) Foreign Application Priority Data

Feb. 28, 2017   (KR) .................. 10-2017-0026513
Feb. 28, 2017   (KR) .................. 10-2017-0026514
Feb. 28, 2017   (KR) .................. 10-2017-0026520

(51) Int. Cl.
*H02J 7/00* (2006.01)
*H02J 9/00* (2006.01)
(Continued)

(52) U.S. Cl.
CPC ............... *H02J 9/062* (2013.01); *H02J 3/32* (2013.01); *H02J 7/007182* (2020.01); *H02J 2207/20* (2020.01)

(58) Field of Classification Search
CPC ........ H02J 9/062; H02J 3/32; H02J 7/007182; H02J 2207/20
(Continued)

(56) References Cited

U.S. PATENT DOCUMENTS 5,949,662 A      9/1999   Boldin et al.
10,523,027 B2 *  12/2019  Sugeno .................. H02J 9/062
(Continued)

FOREIGN PATENT DOCUMENTS

EP       1306958 A2      5/2003
JP      H 11-027877 A    1/1999
(Continued)

OTHER PUBLICATIONS

Office Action dated Oct. 2, 2020 in counterpart application No. JP 2019-543961 (6 pages).
(Continued)

*Primary Examiner* — Richard Tan
(74) *Attorney, Agent, or Firm* — K&L Gates LLP

(57) ABSTRACT

Disclosed is an uninterruptible power supply system comprising an energy storage system (ESS). The uninterruptible power supply system comprises an ESS and is connected to a grid, and further comprises: a first converter for converting an alternating current voltage of the grid into a direct current voltage; a second converter connected in series to the first converter, for converting the direct current voltage outputted from the first converter into an alternating current voltage and transferring same to a load; the ESS comprising a battery connected to a node between the first and second converter, for performing charging and discharging; and a
(Continued)

PLC for receiving the operation statuses of the first and second converters, and on the basis thereof, controlling the operation of the uninterruptible power supply system, wherein the PLC determines the operation mode of the ESS by using the received operation statuses of the first and second converters.

18 Claims, 16 Drawing Sheets

(51) Int. Cl.
    *H02J 9/06*       (2006.01)
    *H02J 3/32*       (2006.01)

(58) Field of Classification Search
    USPC .......................................................... 307/66
    See application file for complete search history.

(56) References Cited

U.S. PATENT DOCUMENTS

| | | | |
|---|---|---|---|
| 2002/0071292 A1* | 6/2002 | Aihara | H02J 9/061 363/20 |
| 2007/0228834 A1 | 10/2007 | Hirahara | |
| 2009/0033154 A1* | 2/2009 | Linkhart | H02J 9/06 307/65 |
| 2011/0006607 A1 | 6/2011 | Kwon et al. | |
| 2011/0215649 A1* | 9/2011 | Min | H02J 1/00 307/72 |
| 2014/0167809 A1 | 6/2014 | Sebald et al. | |
| 2016/0223620 A1 | 8/2016 | Heber | |

FOREIGN PATENT DOCUMENTS

| | | |
|---|---|---|
| JP | 2003-052134 A | 2/2003 |
| JP | 2007-124783 A | 5/2007 |
| JP | 2007267501 A | 10/2007 |
| JP | 2013-258827 A | 12/2013 |
| JP | 2016-063556 A | 4/2016 |
| KR | 2003699130000 | 7/2004 |
| KR | 20120011237 A | 2/2012 |
| KR | 101187836 B1 | 10/2012 |
| KR | 20130105616 A | 9/2013 |
| KR | 20140058770 A | 5/2014 |
| KR | 101425141 B1 | 9/2014 |
| KR | 10-2016-0064973 A | 6/2016 |
| KR | 20160131408 A | 11/2016 |

OTHER PUBLICATIONS

Office Action dated Oct. 7, 2020 in counterpart application No. 10-2017-0026513 (5 pages).
Korean Office Action for related Korean Application No. 10-2017-0026520; report dated Apr. 24, 2020; (5 pages).
Extended European Search Report for related European Application No. 17898814.3; action dated Mar. 25, 2020; (11 pages).
International Search Report for related International Application No. PCT/KR2017/009274 report dated Sep. 7, 2018; (3 pages).
Written Opinion for related International Application No. PCT/KR2017/009274; report dated Sep. 7, 2018; (6 pages).

* cited by examiner

[FIG. 1]
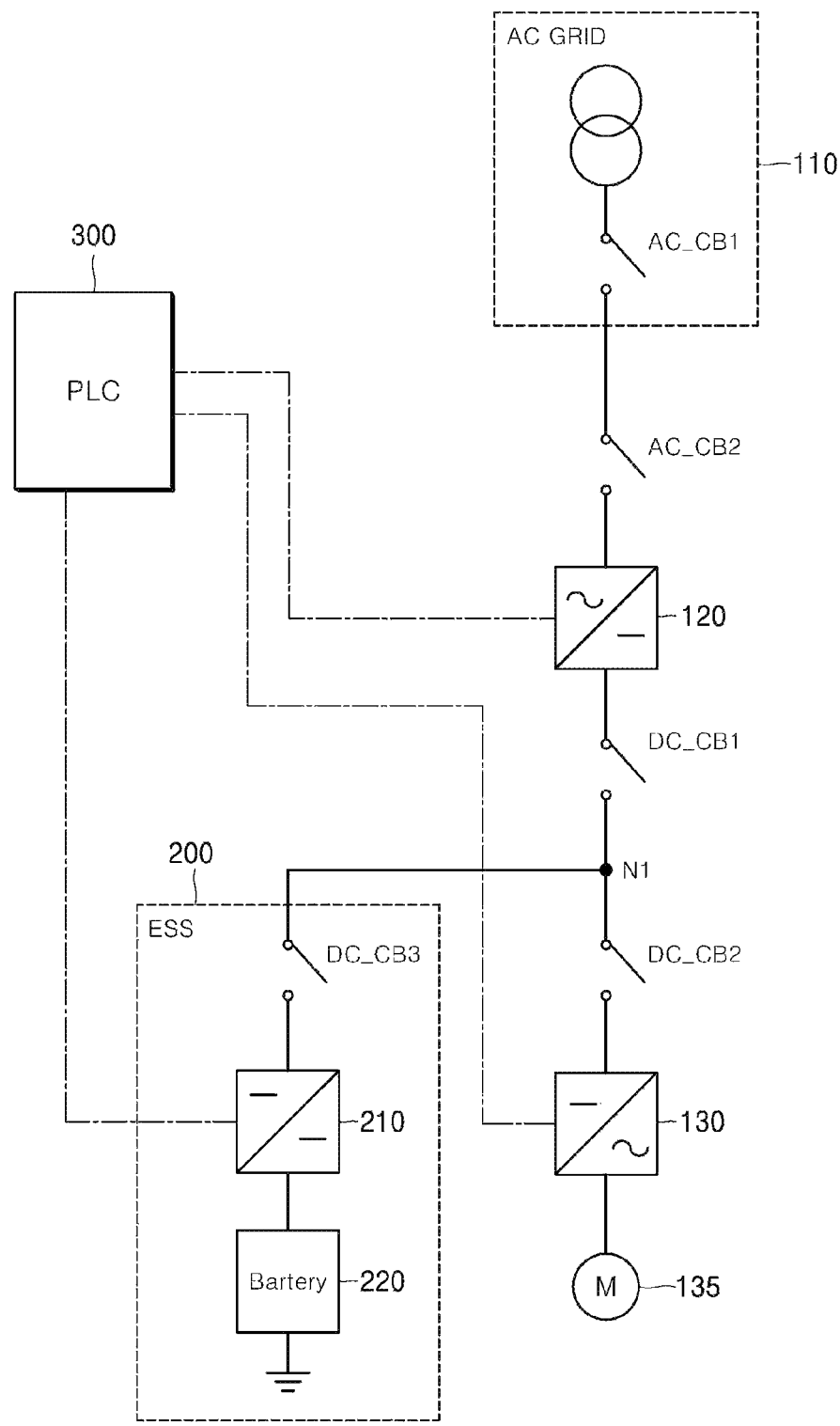

[FIG. 2]
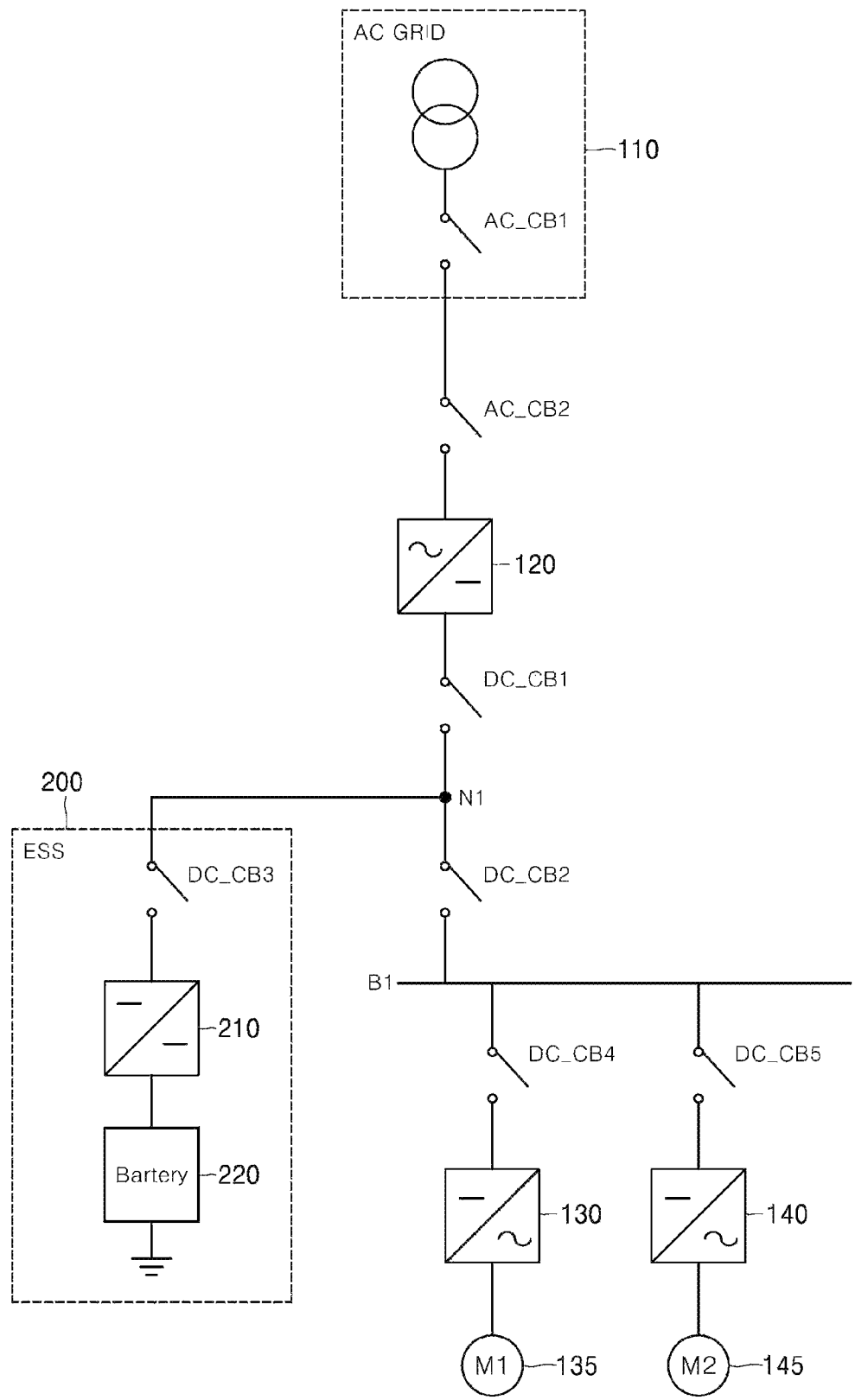

[FIG. 3]
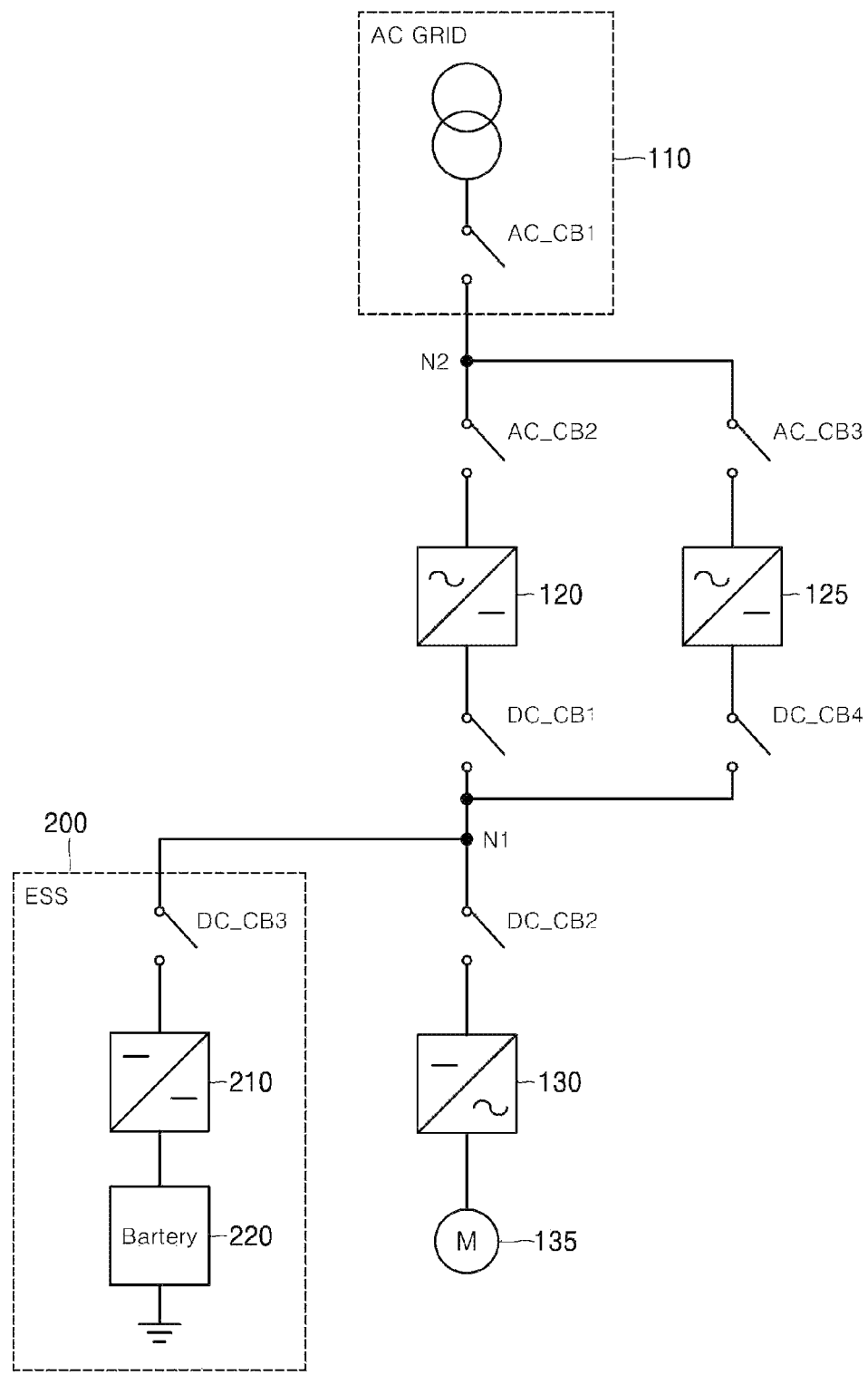

[FIG. 4]
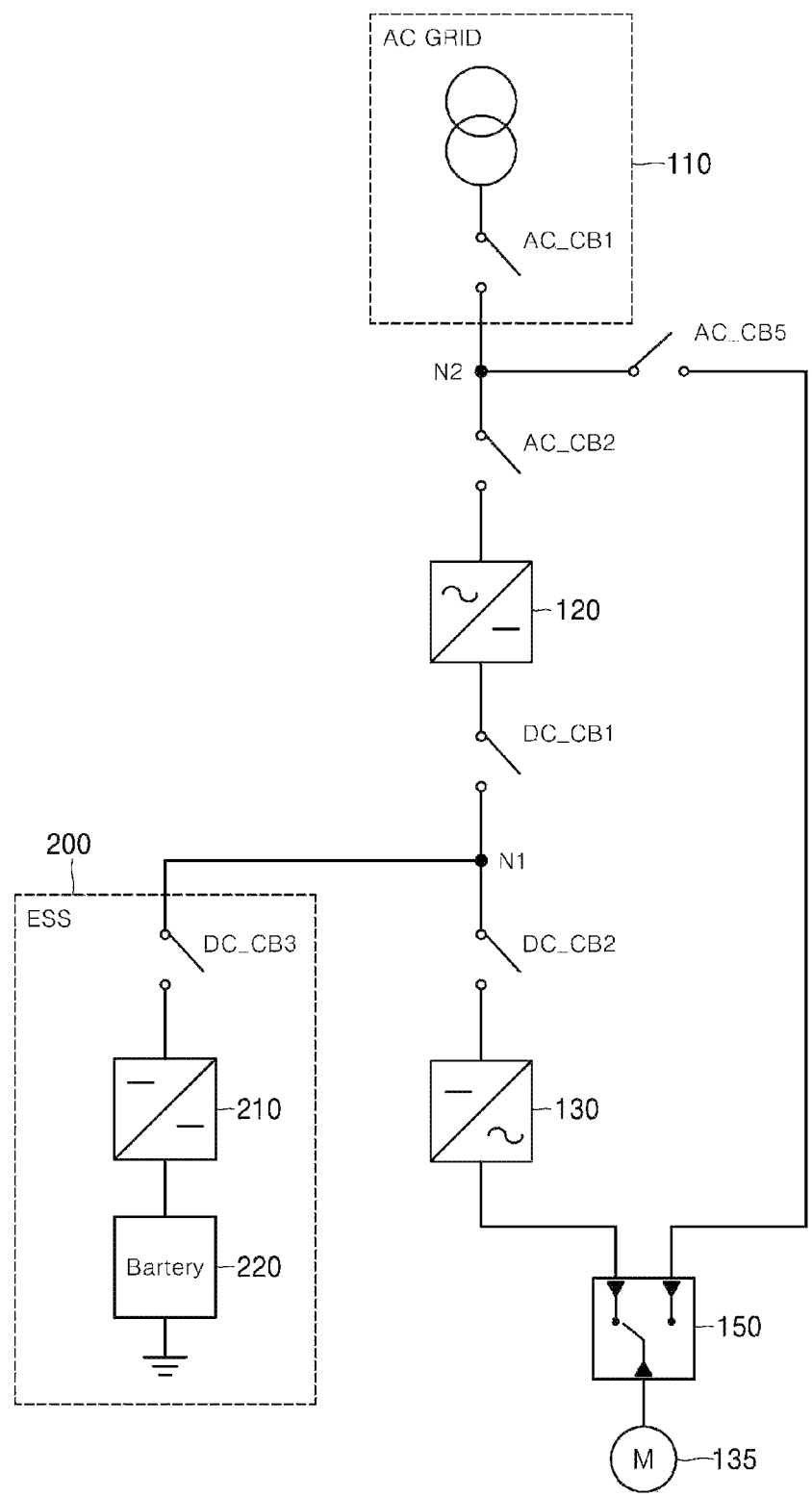

[FIG. 5]
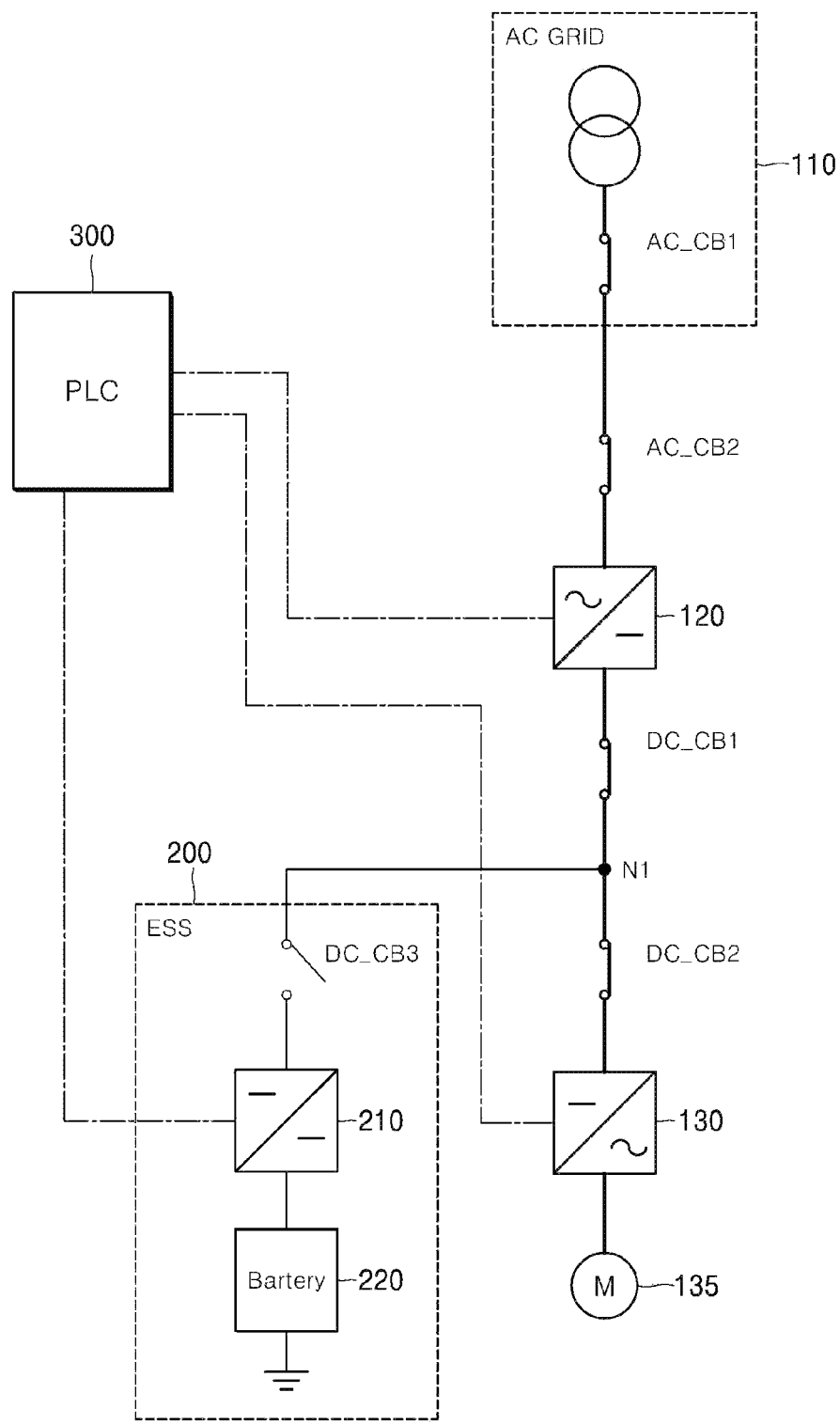
< Normal Mode >

[FIG. 6]
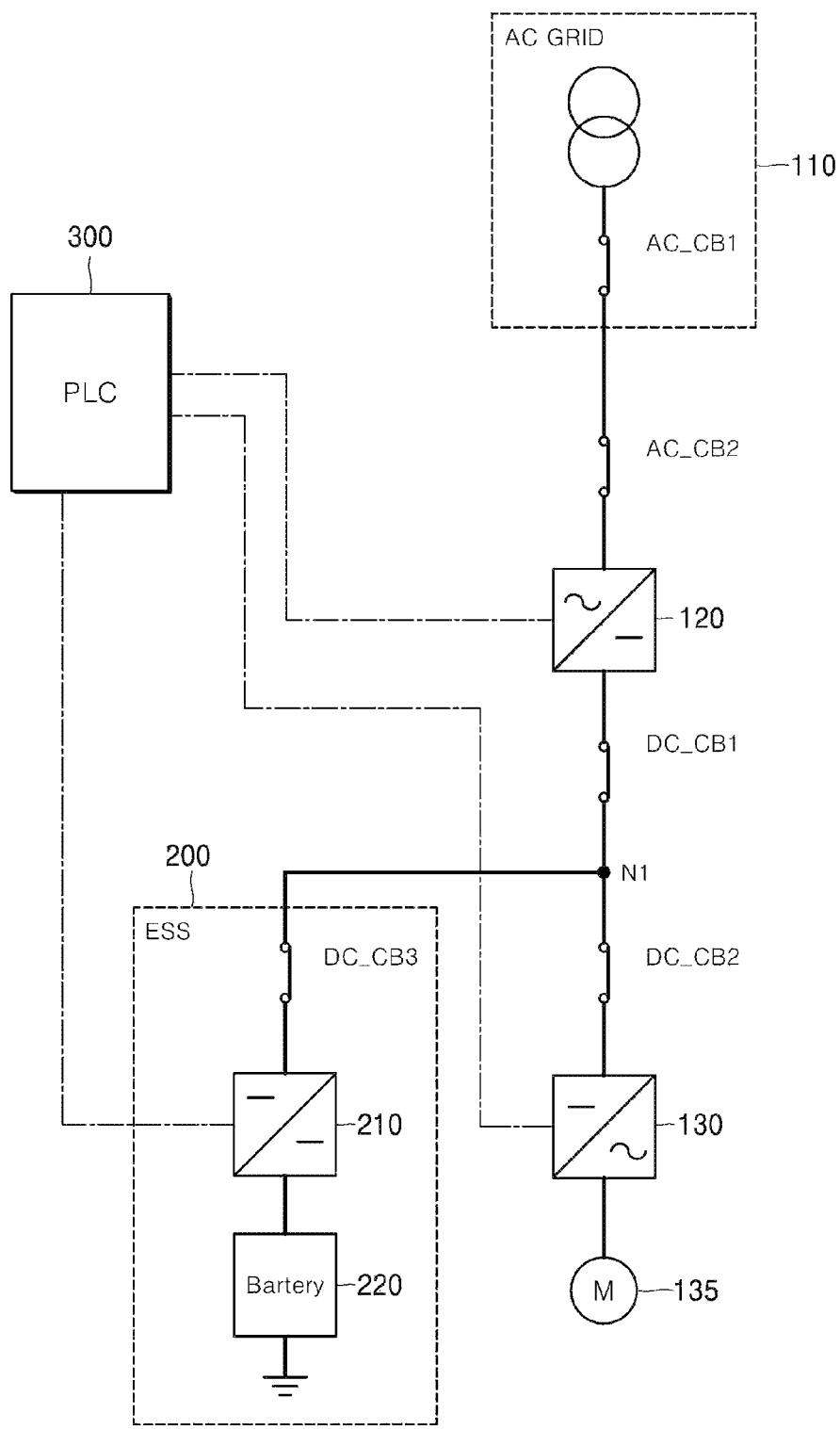
< Charge Mode >

[FIG. 7]
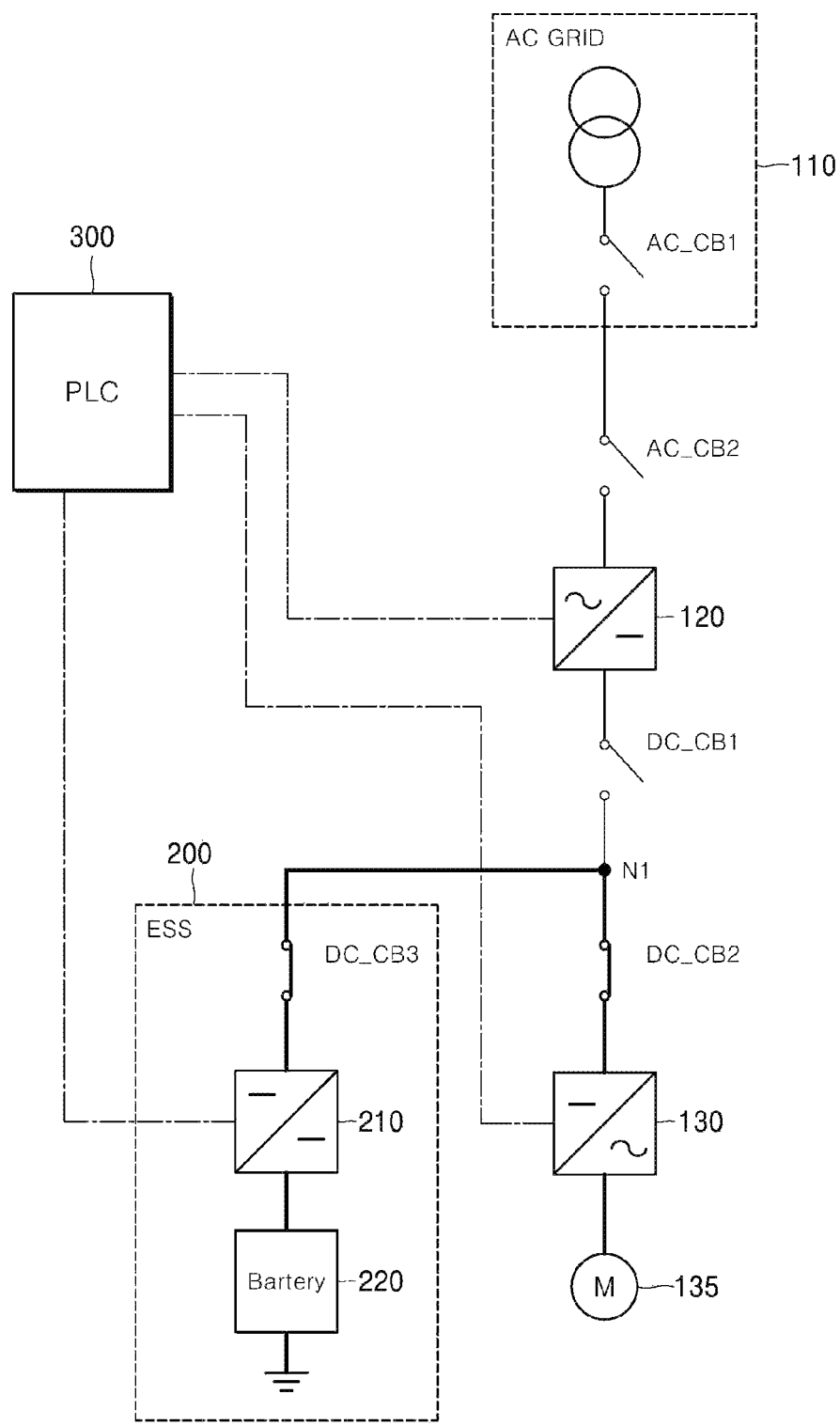
< UPS Mode >

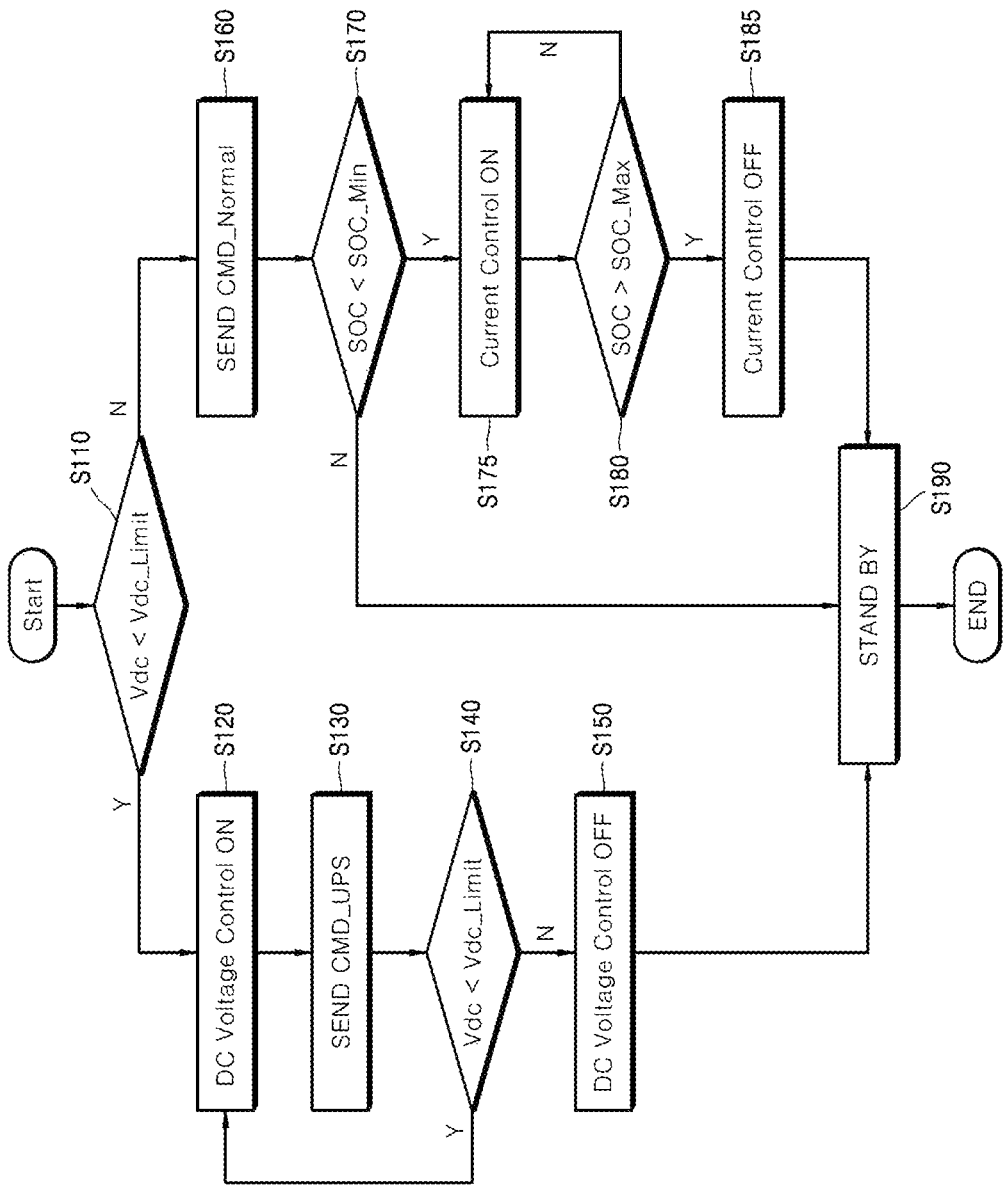
[FIG. 8]

[FIG. 9]
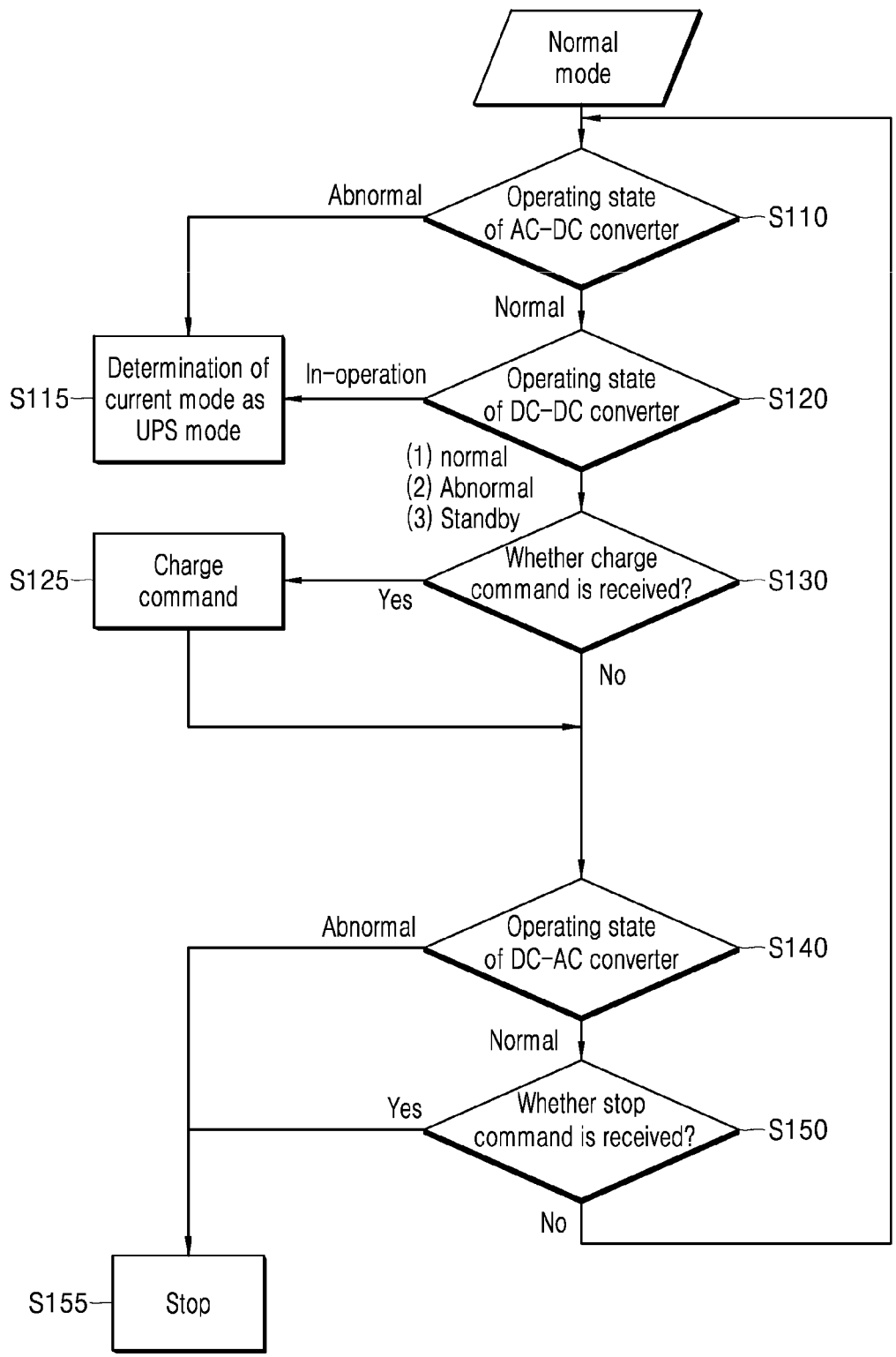

[FIG. 10]
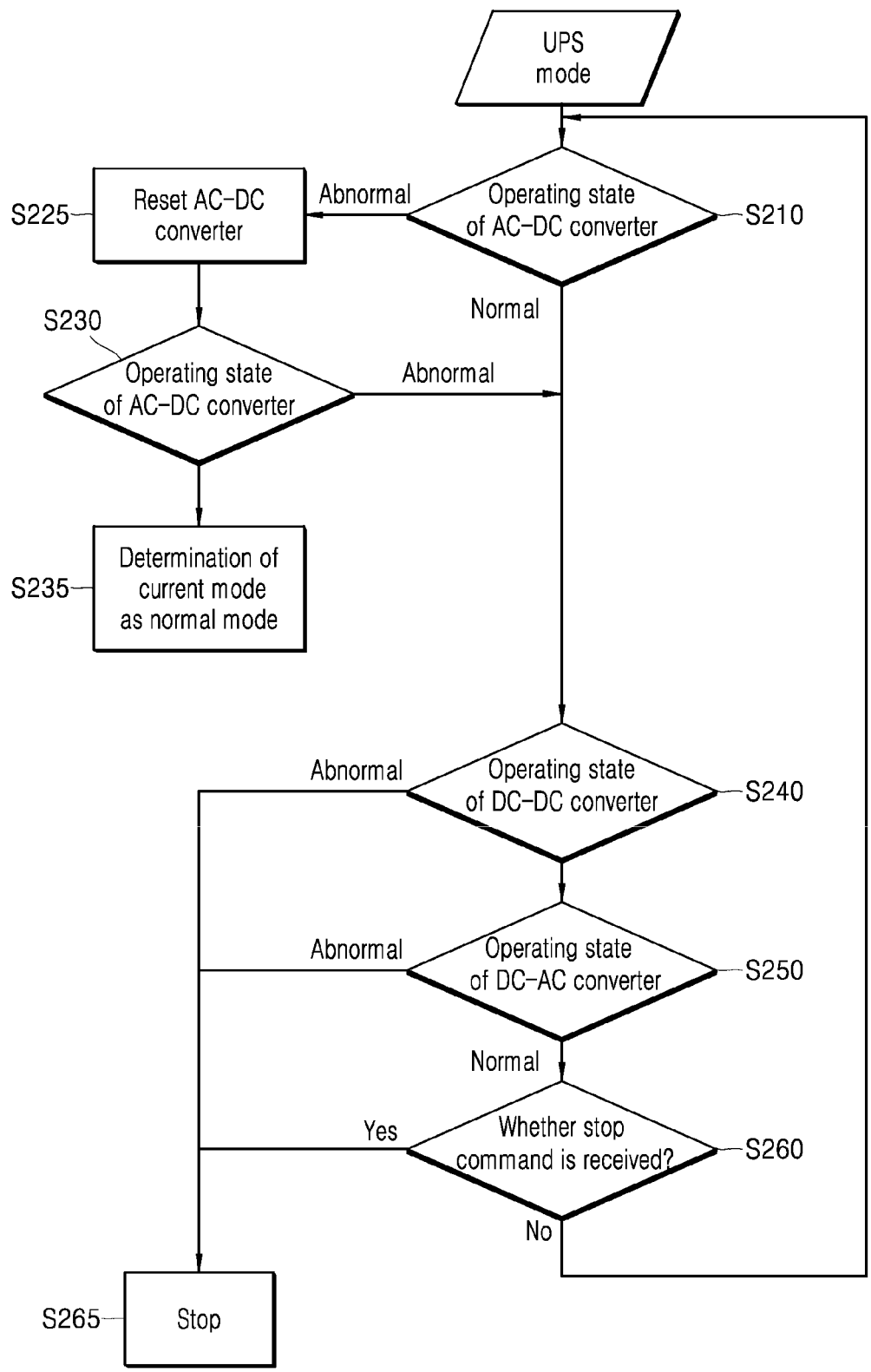

[FIG. 11]
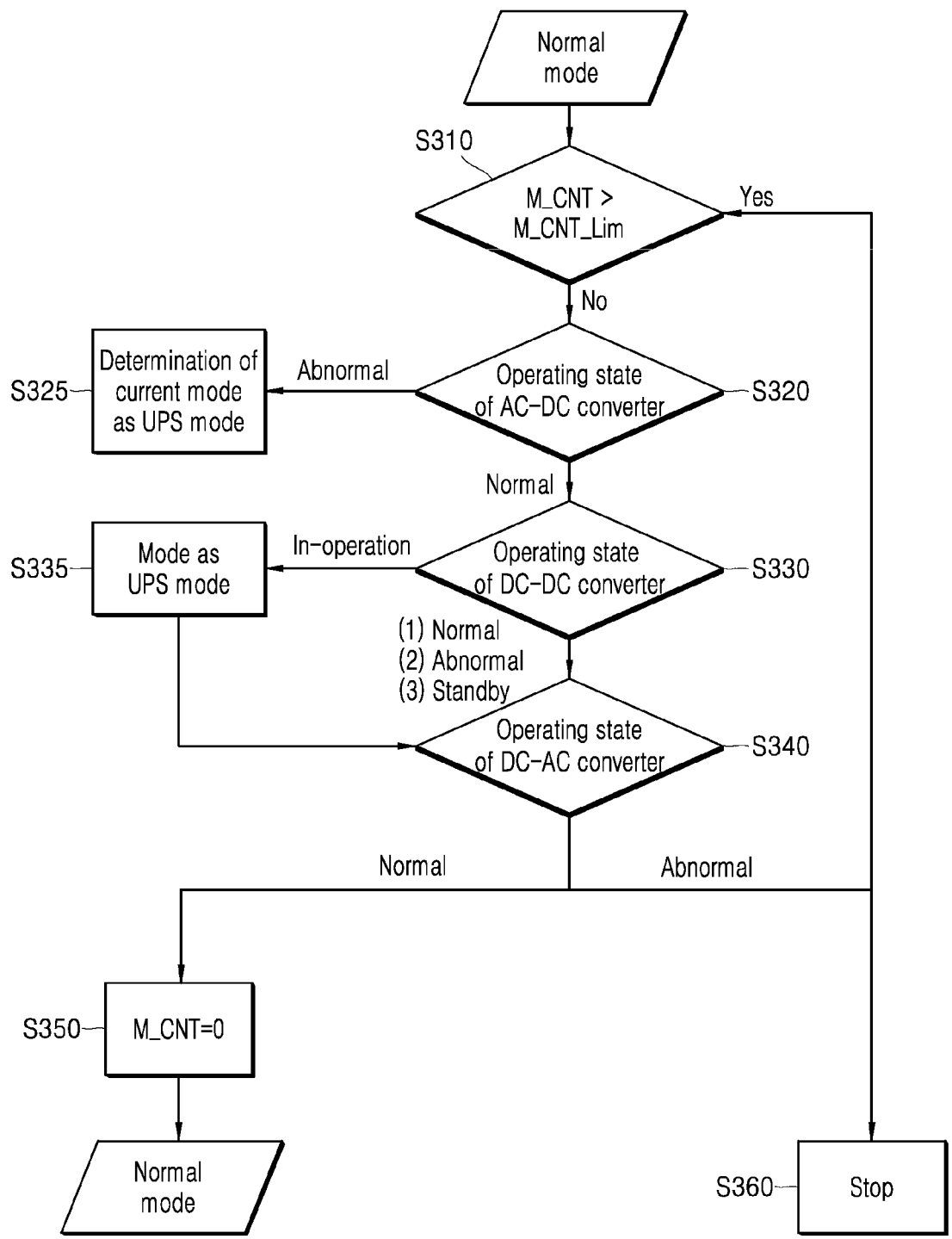

[FIG. 12]
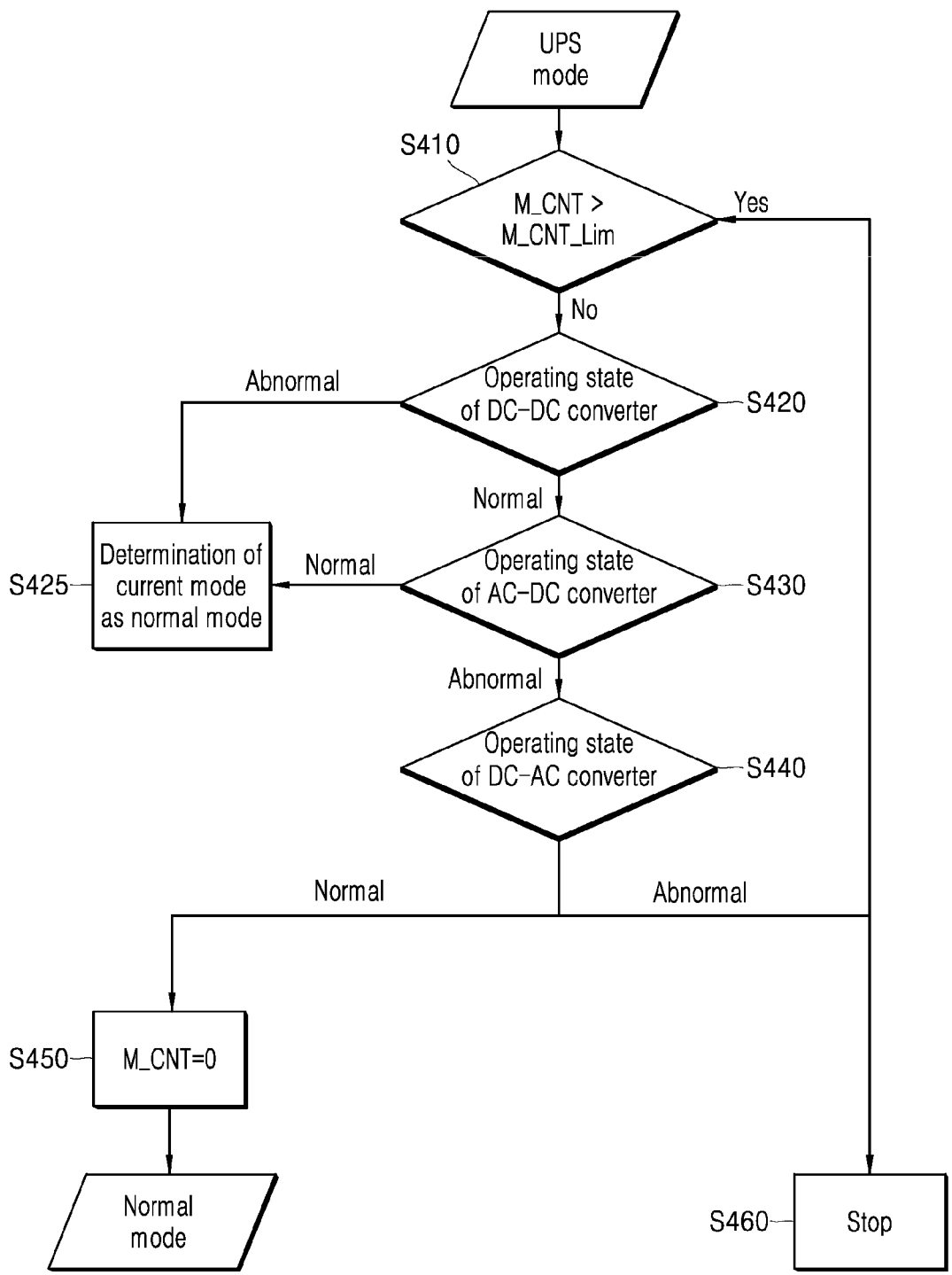

[FIG. 13]
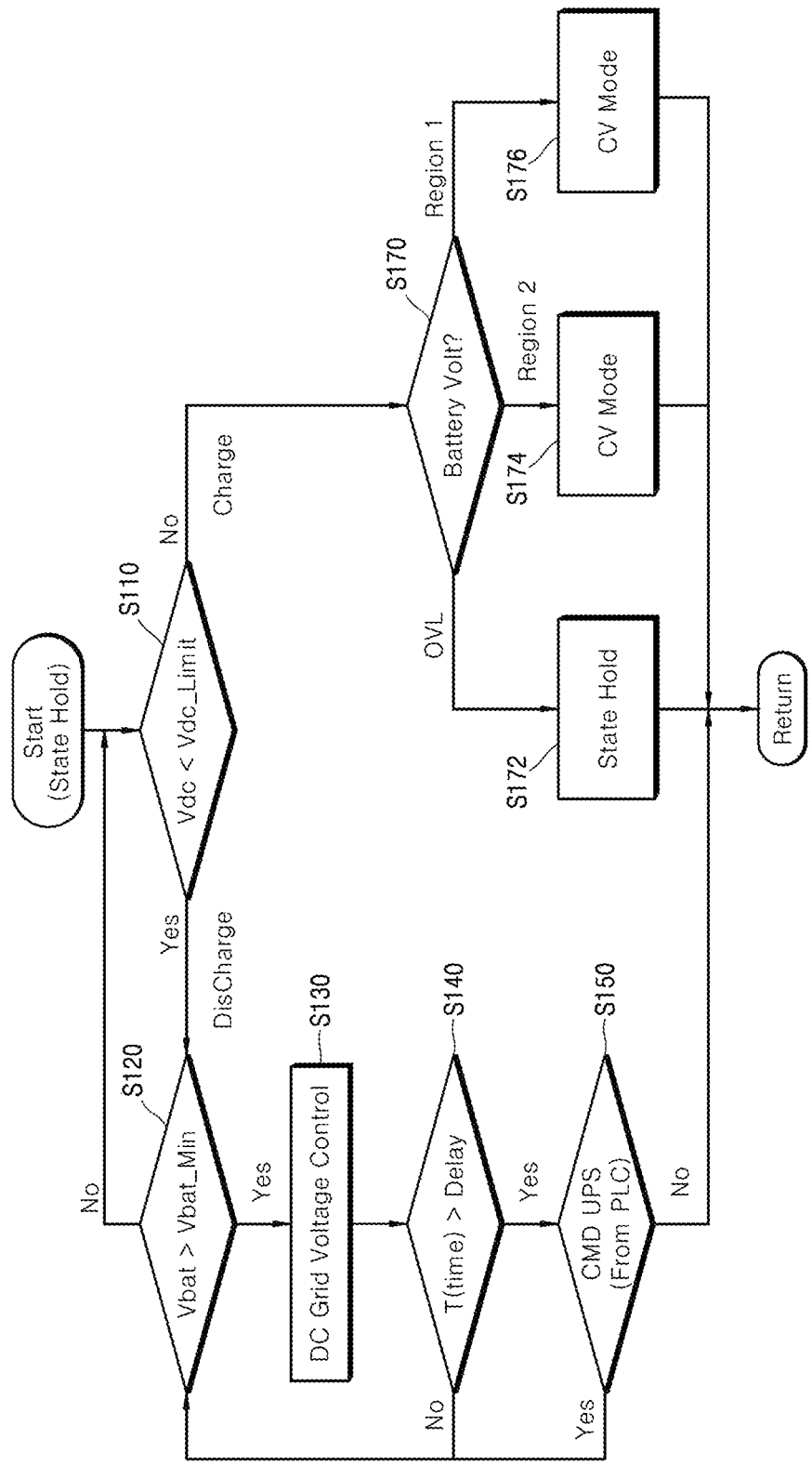

[FIG. 14]
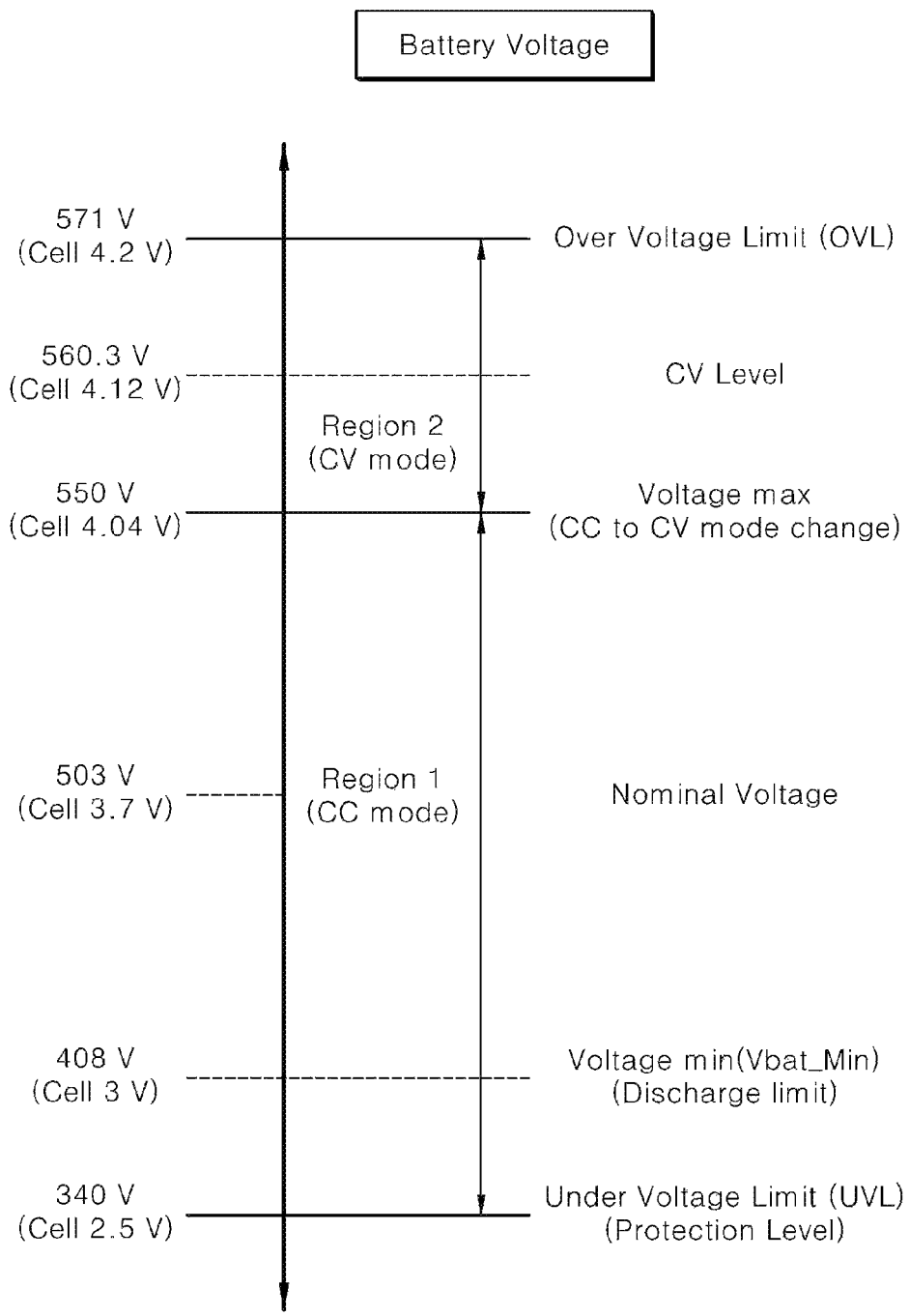

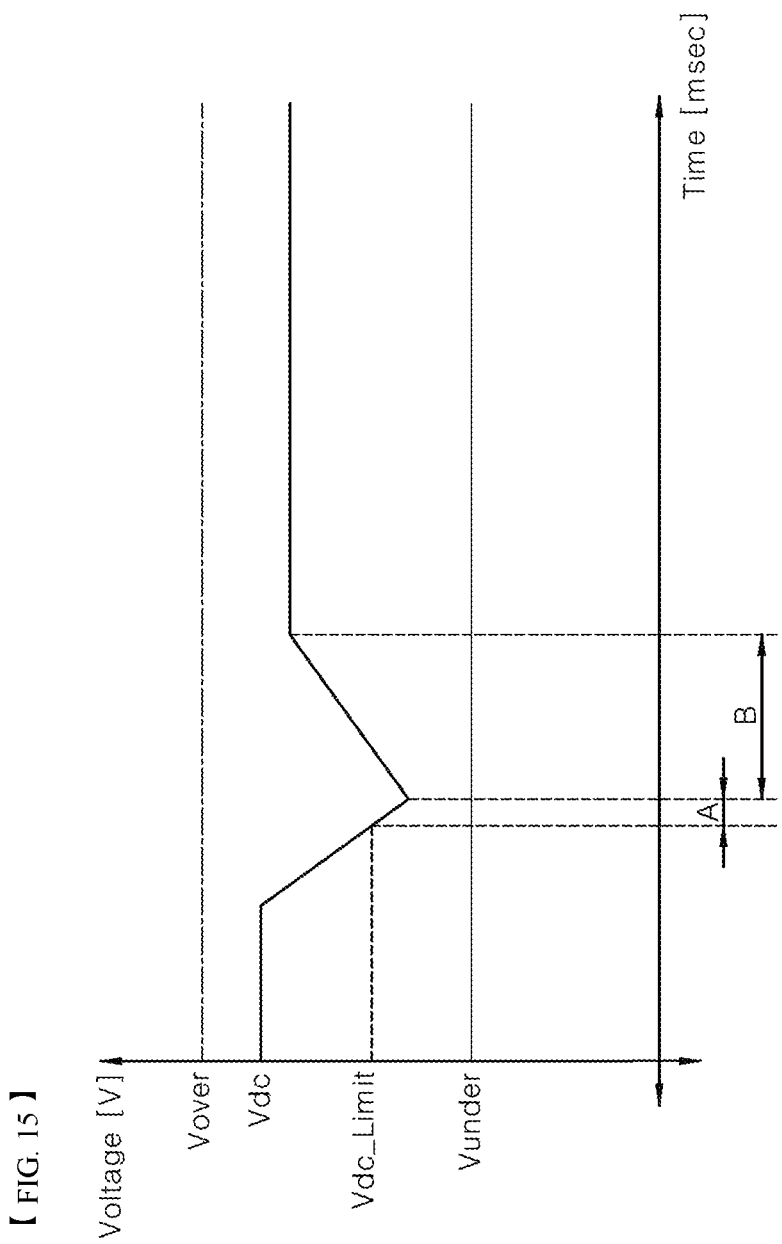
[ FIG. 15 ]

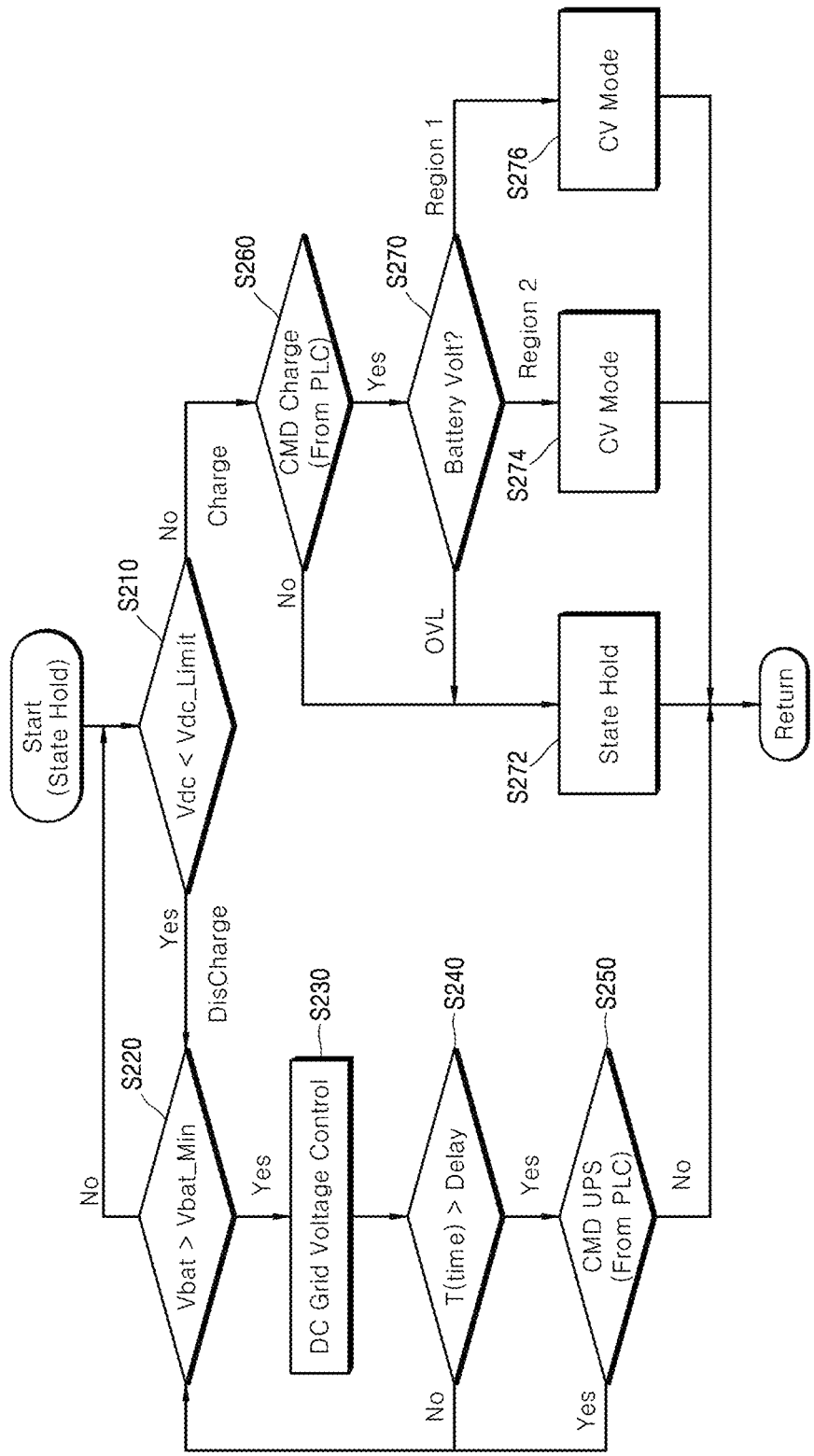
[ FIG. 16 ]

UNINTERRUPTIBLE POWER SUPPLY SYSTEM COMPRISING ENERGY STORAGE SYSTEM

CROSS-REFERENCE TO RELATED APPLICATIONS

The present application is a National Stage of International Application No. PCT/KR2017/009274, filed Aug. 24, 2017, which claims priority to Korean Application No. 10-2017-0026520 filed on Feb. 28, 2017, Korean Application No. 10-2017-0026513 filed on Feb. 28, 2017, and Korean Application No. 10-2017-0026514 filed on Feb. 28, 2017, the disclosure of which are incorporated herein by reference.

FIELD OF THE DISCLOSURE

The present disclosure relates to an uninterruptible power supply system including an energy storage system, and more specifically, to an uninterruptible power supply system that improves a response speed of an energy storage system in an accident event and simplifies a relationship between a command and control.

DISCUSSION OF THE RELATED ART

An uninterruptible power supply system (Energy Storage System) stores generated power in each linkage system including power plants, substations, and transmission lines, and then uses the power selectively and efficiently when necessary to improve energy efficiency.

When the uninterruptible power supply system improves an overall load factor by leveling electrical loads with large time-based and season-based fluctuations, the system may lower a power generation cost and reduce an investment cost and an operating cost required for expansion of an electric power facility, thereby reducing an electric charge and saving energy.

The uninterruptible power supply system may be installed in a power generation plant, a transmission and distribution line, and a consumer. The uninterruptible power supply system may perform frequency regulation, generator output stabilization using new renewable energy, peak shaving, load leveling, and emergency power, etc.

Energy storage in the uninterruptible power supply system may be divided into physical energy storage and chemical energy storage system depending on an energy storage scheme. The physical energy storage may employ pumping-up power generation, compressed air storage, flywheel, etc. The chemical energy storage may employ lithium ion battery, lead storage battery, and Nas battery, etc.

Further, the uninterruptible power supply system includes a high-level controller (PLC: programmable logic controller) for controlling each of components. The PLC communicates with each component to determine a current operating state thereof. The PLC controls all sequence operations of the uninterruptible power supply system and commands each component to operate according to each situation. The PLC and each component communicate with each other via a wireless or wired communication scheme.

In the uninterruptible power supply system, the PLC and each component may communicate with each other. In this case, as circuitry becomes complicated and the number of the components increases, complexity of connections therebetween may be increased and the performance of the system may be limited.

More specifically, as the complexity increases when the PLC and each component communicate with each other, interference to a communication signal occurs, which increases a probability of errors occurring during operation of the system. Thus, there is a problem in that an operation in an uninterruptible power supply (UPS) mode is slowed down.

SUMMARY OF DISCLOSURE

Technical Purpose

A purpose of the present disclosure is to provide an uninterruptible power supply system in which an energy storage system actively supplies uninterruptable power, and a PLC determines an operating mode of the energy storage system based on an operating state of each component, such that the PLC may control the system stably and effectively.

Further, another purpose of the present disclosure is to provide an uninterruptible power supply system in which before a command from the PLC is received by a DC-DC converter of the energy storage system, the converter actively determines whether to execute an UPS mode and supplies the uninterruptible power based on the determination, thereby to ensure a high response speed in an accident event and to simplify a relationship between control and command.

The purpose of the present disclosure is not limited to the above-mentioned purposes. Other purposes and advantages of the present disclosure which are not mentioned may be understood from the following description and will be more clearly understood from embodiments of the present disclosure. It is to be readily understood that the purposes and advantages of the present disclosure may be realized and attained using solutions and combinations thereof as recited in the appended claims.

Technical Solutions

In a first aspect of the present disclosure, there is provided an uninterruptible power supply system connected to a grid, the system comprising: a first converter configured to convert alternate current (AC) voltage of the grid to direct current (DC) voltage; a second converter connected in series with the first converter, wherein the second converter is configured to convert the DC voltage output from the first converter to AC voltage and to transmit the AC voltage to a load; an energy storage system including a battery, wherein the energy storage system is electrically connected to a node between the first converter and the second converter for charging and discharging the node; a programmable logic controller (PLC) configured to receive an operating state of each of the first and second converters, and to control an operation of the uninterruptible power supply system based on the received operating state, wherein the PLC is configured to determine an operating mode of the energy storage system based on the received operating states of the first and second converters.

In one implementation of the first aspect, when the PLC determines that the operating state of the first converter is abnormal, the PLC is configured to determine that the operating mode of the energy storage system is an uninterruptible power supply (UPS) mode, or is configured to switch the operating mode of the energy storage system to the UPS mode, and the PLC is configured to reset the first converter.

In one implementation of the first aspect, the energy storage system further includes a third converter, wherein the third converter is disposed between and connected to the battery and the node and is configured to vary a magnitude of DC voltage across the third converter, wherein the PLC is configured to: when the operating state of the first converter is determined to be normal after resetting the first converter, switch the operating mode the energy storage system to a normal mode; or when the operating state of the first converter is determined to be abnormal after resetting the first converter, switch the operating mode the energy storage system to an UPS mode to monitor operating states of the second and third converters.

In one implementation of the first aspect, when the PLC determines that the operating state of the third converter is abnormal, the PLC is configured to stop the uninterruptible power supply system, and to connect the grid to the load.

In one implementation of the first aspect, the energy storage system further includes a third converter, wherein the third converter is disposed between and connected to the battery and the node and is configured to vary a magnitude of DC voltage across the third converter, wherein the PLC is configured to: when the operating mode of the energy storage system is a normal mode, and when an operating state of the third converter is an in-operation mode, determine the operating mode of the energy storage system as an UPS mode; or when the operating mode of the energy storage system is a normal mode, and when the operating state of the third converter is determined to be a standby state or be an abnormal state, determine the operating mode of the energy storage system as a normal mode.

In one implementation of the first aspect, when the PLC determines that the operating state of the second converter is abnormal, the PLC is configured to stop the uninterruptible power supply system, and to connect the grid to the load.

In one implementation of the first aspect, the PLC is configured to: count a number of mode switching times of the energy storage system; and when the number of times the mode switching times is greater than a predetermined value, stop the uninterruptible power supply system, and connect the grid to the load.

In a second aspect of the present disclosure, there is provided an uninterruptible power supply system connected to a grid, the system comprising: a first converter configured to convert alternate current (AC) voltage of the grid to direct current (DC) voltage; a second converter connected in series with the first converter, wherein the second converter is configured to convert the DC voltage output from the first converter to AC voltage and to transmit the AC voltage to a load; a battery electrically connected to a node between the first converter and the second converter for charging and discharging the node; and a third converter disposed between and connected to the battery and the node and configured to vary a magnitude of DC voltage across the third converter; wherein the third converter is configured to, when a voltage at the node is lower than a predetermined limit voltage, operate in an UPS mode to provides power stored in the battery to the node.

In one implementation of the second aspect, the system further include a PLC, wherein the PLC is configured to: receive information on the operating states of the first to third converters; generate a command indicating an operating mode of the third converter based on the operating states of the first and second converters; and transmit the generated command to the third converter.

In one implementation of the second aspect, a first response unit time for which the third converter senses the voltage of the node and determines an operating mode based on the voltage is smaller than a second response unit time for which the PLC updates the command indicating the operating mode of the third converter.

In one implementation of the second aspect, the third converter is configured to: calculate an operation time by accumulating the first response unit time; and when the operation time is smaller than the second response unit time, maintain the operating mode of the third converter.

In one implementation of the second aspect, when the third converter receives the command indicating the operating mode thereof from the PLC, the third converter is configured to operate in the operating mode indicated by the received command.

In one implementation of the second aspect, when the third converter receives a command indicating the charging operation from the PLC, the third converter may operate in a hold mode or a charge mode depending on the voltage level of the battery.

In one implementation of the second aspect, when the voltage at the node is greater than a predetermined limit voltage, the third converter is configured to operate in a mode varying based on a voltage level of the battery.

In one implementation of the second aspect, when the battery is at a first level as an over voltage limit (OVL) level, the third converter is configured to operate in a hold mode, wherein when the voltage level of the battery is lower than the first level, the third converter is configured to operate in a charge mode to charge the battery.

In one implementation of the second aspect, when the voltage level of the battery is between the first level and a second level lower than the first level, the third converter is configured to charge the battery in a first scheme, wherein when the voltage level of the battery is between the second level and a third level lower than the second level, the third converter is configured to charge the battery in a second scheme different from the first scheme.

In one implementation of the second aspect, when the voltage level of the battery is greater than a predetermined minimum battery voltage level, the third converter is configured to operate in the UPS mode.

In a third aspect of the present disclosure, there is provided an uninterruptible power supply system connected to a grid and including an energy storage system, the uninterruptible power supply system comprising: a first converter configured to convert alternate current (AC) voltage of the grid to direct current (DC) voltage; a second converter connected in series with the first converter, wherein the second converter is configured to convert the DC voltage output from the first converter to AC voltage and to transmit the AC voltage to a first load; and the energy storage system including a battery, wherein the energy storage system is electrically connected to a node between the first converter and the second converter for charging and discharging the node, wherein when a voltage at the node is lower than a predetermined limit voltage, the energy storage system is configured to operate in an UPS mode to provide power stored in the battery to the node.

In one implementation of the third aspect, the uninterruptible power supply system further includes: a fourth converter connected in parallel with the second converter, wherein the fourth converter is configured to convert the DC voltage output from the first converter to AC voltage and transmit the AC voltage to a second load other than the first load and; and a bus disposed between the first converter and the second and fourth converters, wherein the energy storage system is configured to determine whether to operate in the UPS mode based on a voltage of the bus.

In one implementation of the third aspect, the uninterruptible power supply system further includes a fifth converter connected in parallel with the first converter and configured to convert AC voltage of the grid to DC voltage, wherein when the first converter is abnormal, the fifth converter is turned on to convert AC voltage of the grid to DC voltage and transfer the DC voltage to the second converter.

In one implementation of the third aspect, the uninterruptible power supply system further includes a switch module placed between the second converter and the first load, wherein one end of the switch module is connected to an output of the second converter, while the other end thereof is connected to the grid, wherein one of one end and the other end of the switch module is selectively connected to the first load.

Technical Effects

In the uninterruptible power supply system in accordance with the present disclosure, before a command from the PLC is received by the energy storage system, the energy storage system actively supplies the uninterruptible power, thereby to ensure a high response speed in an accident event and to simplify a relationship between control and command.

Further, in the uninterruptible power supply system in accordance with the present disclosure, an operation control algorithm for receiving only the operating state of each component and for determining the operating mode of the system based on the received operating state may be employed, thereby to simplify an operation control between the PLC and each component.

Accordingly, in the uninterruptible power supply system in accordance with the present disclosure, the communication error probability may be reduced by mitigating the complexity of communication connections between the components, thereby improves the stability of the uninterruptible power supply system. Further, maintenance and management of the uninterruptible power supply system is facilitated, thereby to reduce various resources and costs required for managing the system.

Further, in the uninterruptible power supply system in accordance with the present disclosure, an algorithm for controlling the operation of the DC-DC converter included in the energy storage system of the uninterruptible power supply system may be simplified. Thus, in an accident event, the response speed of the energy storage system may be improved. Further, the communication error probability may be lowered by mitigating the complexity of the communication connections between the components, thereby to improve the stability of the uninterruptible power supply system.

Specific effects of the present disclosure together with the effects as described above will be described together with reference to descriptions of specific details for carrying out the present disclosure.

BRIEF DESCRIPTION OF THE DRAWINGS

FIG. 1 is a block circuit diagram showing an uninterruptible power supply system according to a first embodiment of the present disclosure.

FIG. 2 is a block circuit diagram showing an uninterruptible power supply system according to a second embodiment of the present disclosure.

FIG. 3 is a block circuit diagram showing an uninterruptible power supply system according to a third embodiment of the present disclosure.

FIG. 4 is a block diagram showing an uninterruptible power supply system according to a fourth embodiment of the present disclosure.

FIG. 5 is a diagram for describing an operation in a normal mode of an uninterruptible power supply system according to some embodiments of the present disclosure.

FIG. 6 is an illustration for describing an operation in a charge mode of an uninterruptible power supply system according to some embodiments of the present disclosure.

FIG. 7 is a diagram for describing an operation in an UPS mode of an uninterruptible power supply system according to some embodiments of the present disclosure.

FIG. 8 is a flowchart for describing the operation of an energy storage system included in an uninterruptible power supply system according to one embodiment of the present disclosure.

FIG. 9 is a flow chart for describing an operation in a normal mode of a PLC included in the uninterruptible power supply system according to one embodiment of the present disclosure.

FIG. 10 is a flowchart for describing an operation in a UPS mode of a PLC included in an uninterruptible power supply system according to one embodiment of the present disclosure.

FIG. 11 and FIG. 12 are flowcharts for describing operations of a PLC included in an uninterruptible power supply system according to another embodiment of the present disclosure.

FIG. 13 is a flowchart for describing an operation algorithm of a DC-DC converter included in an uninterruptible power supply system according to another embodiment of the present disclosure.

FIG. 14 is a graph for describing a charging scheme of a battery included in an energy storage system of an uninterruptible power supply system according to another embodiment of the present disclosure.

FIG. 15 is a graph for describing a voltage of a node connected to one end of a DC-DC converter included in an uninterruptible power supply system according to another embodiment of the present disclosure.

FIG. 16 is a flowchart for describing an operation algorithm of a DC-DC converter included in an uninterruptible power supply system according to another embodiment of the present disclosure.

DETAILED DESCRIPTIONS

The foregoing objects, features and advantages will be described in detail below with reference to the accompanying drawings. Accordingly, those of ordinary skill in the art to which the present disclosure belongs may easily implement the technical idea of the present disclosure. In the description of the present disclosure, when a specific description of a well-known component related to the present disclosure is found to be unnecessarily obscuring a gist of the present disclosure, the detailed description thereof shall be omitted. Hereinafter, a preferred embodiment according to the present disclosure will be described in detail with reference to the accompanying drawings. In the drawings, the same reference numerals are used to denote the same or similar components.

Hereinafter, an uninterruptible power supply system including an energy storage system according to some embodiments of the present disclosure will be described with reference to FIGS. 1 to 16.

FIG. 1 is a block circuit diagram showing an uninterruptible power supply system according to a first embodiment of the present disclosure.

Referring to FIG. 1, an uninterruptible power supply system according to a first embodiment of the present disclosure includes a grid (AC GRID) 110, a first converter 120, a second converter 130, a first load 135, and an energy storage system 200. Further, a PLC (programmable logic controller) 300 for controlling each component of the uninterruptible power supply system may be included in the uninterruptible power supply system.

Specifically, the grid (AC GRID) 110 provides AC voltage to a first converter 120 via a switch AC_CB1.

The first converter 120 includes an AC-DC converter that converts the AC voltage provided by the grid 110 into a DC voltage. In this connection, the first converter 120 includes an AC-DC IGBT (insulated gate bipolar mode transistor-type) converter, but the present disclosure is not limited thereto.

A switch AC_CB2 may be placed between the first converter 120 and the grid 110. The switch AC_CB2 may electrically connect or disconnect an AC voltage transmission line. The first converter 120 and the switch AC_CB2 may be controlled by a command from the PLC 300.

The second converter 130 is connected in series with the first converter 120. The DC voltage provided from the first converter 120 may be converted via the second converter 130 to the AC voltage to be transmitted to the first load 135. In this connection, the second converter 130 includes a DC-AC IGBT type converter, but the present disclosure is not limited thereto.

A plurality of switches DC_CB1 and DC_CB2 may be disposed between the second converter 130 and the first converter 120. The plurality of switches DC_CB1 and DC_CB2 may electrically connect or disconnect a DC voltage transmission line. Similarly, the second converter 130 and the plurality of switches DC_CB1 and DC_CB2 may be controlled by the command of the PLC 300.

The first load 135 may be embodied as a variety of electronic devices and equipment consuming power.

The energy storage system 200 may be directly connected to between the first converter 120 and the second converter 130. In this connection, the energy storage system 200 measures a voltage of a node N1 between the first converter 120 and the second converter 130 before receiving the command of the PLC 300. When the voltage of the node N1 becomes lower than a reference voltage, the energy storage system 200 may automatically transfer power of a battery 220 thereof to the second converter 130. A detailed description thereof will be described later.

The energy storage system 200 may include a third converter 210 and the battery 220. In this connection, a single battery 220 is shown in the drawing, but the present disclosure is not limited thereto. The battery 220 may include a plurality of battery cells, or a battery structure of battery cells connected in parallel, in series or in combination thereof. The battery 220 may receive the power from the grid 110 and store the power therein and may provide the first load 135 with the stored power.

The third converter 210 may be positioned between the node N1 between the first converter 120 and the second converter 130 and the battery 220. The third converter 210 may change a magnitude of DC voltage across the battery 220 so that the battery 220 outputs or receives a constant power. In this connection, the second converter 130 includes a DC-DC IGBT-type converter, but the present disclosure is not limited thereto.

Further, the third converter 210 may operate as a bi-directional converter. Therefore, a charge circuit/discharge circuit of the third converter 210 may be integrated into a single circuit. The third converter 210 may charge the battery 220 when the converter 210 is not operating in an UPS mode. The third converter 210 may manage a State of Charge (SOC) of the battery 220. However, the present disclosure is not limited to thereto.

Although a single energy storage system 200 is shown as being included in the uninterruptible power supply system, the present disclosure is not limited thereto. In another example, a plurality of energy storage systems 200 may be included in the uninterruptible power supply system. In this connection, the plurality of energy storage systems 200 may be connected in parallel to the same node or in series with each other.

Further, when the first converter 120 operates normally, the energy storage system 200 turns off the switch DC_CB3 between the third converter 210 and the node N1. This state of the energy storage system 200 may be called "normal mode". The third converter 210 of the energy storage system 200 turns off the switch DC_CB3 positioned between the node N1 and the third converter 210 when the first converter 120 operates normally in the normal mode.

In this normal mode, the energy storage system 200 may operate in a "stop mode", a "standby mode", and a "hold mode".

Specifically, the stop mode refers to a mode in which all operations of the energy storage system 200 stop.

The standby mode refers to a mode in which the energy storage system 200 is in standby without monitoring the voltage of the node N1

The hold mode refers to a mode in which the energy storage system 200 is in standby while monitoring the voltage of the node N1 and may be opposite to the standby mode. In this case, the energy storage system 200 may be switched to an "UPS (uninterruptible power supply) mode" when the voltage of the node N1 decreases.

In one example, when a state of charge (hereinafter, referred to as SOC level) of the battery 220 becomes lower than a preset value, the energy storage system 200 may turn on the switch DC_CB3 to charge the battery 220. This state of the energy storage system 200 may be called a "charge mode".

However, the present disclosure is not limited thereto. A "constant charging scheme" may be used in which the energy storage system 200 operates in the charge mode immediately according to the voltage Vdc of the node N1 irrespective of the SOC level of the battery 220.

Further, the energy storage system 200 may detect an abnormal operation of the grid 110 or the first converter 120 by monitoring the voltage level of the node N1 in real time. In this case, the energy storage system 200 turns on the switch DC_CB3 to transfer the power stored in the battery 220 to the first load 135. This state of the energy storage system 200 is referred to as a "UPS mode".

A detailed description of an operation algorithm of the energy storage system 200 will be described later.

The PLC 300 receives the operating states of the first converter 120, the second converter 130, and the third converter 210. Based on those operating states, the operation of the uninterruptible power supply system may be controlled by the PLC 300.

Specifically, the PLC 300 may determine an operating mode of the energy storage system 200 using the operating states of the first converter 120, the second converter 130, and the third converter 210 as received. Based on this determination result, the operation of the uninterruptible power supply system may be controlled by the PLC 300. For example, when the PLC 300 determines that the operating state of the first converter 120 is abnormal, the operating mode of the energy storage system 200 is determined to be the UPS mode by the PLC 300. Then, the first converter 120 may be reset by the PLC 300. Further, when the PLC 300 determines that the operating state of the second converter 130 of is abnormal, the uninterruptible power supply system may be stopped by the PLC 300 for the safety reason. A detailed description of the control operation under the PLC 300 will be described later with reference to FIGS. 9 to 12.

The PLC 300 may communicate wirelessly or wiredly with each component included in the uninterruptible power supply system. For example, the PLC 300 may perform data communication with each component of the uninterruptible power supply system using a protocol such as RS 485, CAN, TCP (Transmission Control Protocol/IP Internet Protocol), and UDP (User Datagram Protocol). However, the present disclosure is not limited thereto.

Further, the PLC 300 may control the operation of each component included in the uninterruptible power supply system based on the operating mode of the energy storage system 200. For example, the PLC 300 may control the operations of the first converter 120 and the second converter 130, and may control the operations of the switches AC_CB1, AC_CB2, DC_CB1, and DC_CB2 included in the uninterruptible power supply system. However, the present disclosure is not limited thereto.

FIG. 2 is a block circuit diagram showing an uninterruptible power supply system according to a second embodiment of the present disclosure. For the sake of convenience of the description, a duplicated description with the description of the above-described embodiment will be omitted and differences between the first and second embodiments will be mainly described.

Referring FIG. 2, the uninterruptible power supply system according to the second embodiment of the present disclosure includes all of the components of the uninterruptible power supply system as described with reference to FIG. 1, and may have substantially similar operations as those thereof, but may further include a fourth converter 140, a second load 145, and a bus B1.

The fourth converter 140 is connected in parallel with the second converter 130. A DC voltage output from the first converter 120 may be converted by the fourth converter 140 into an AC voltage to provide power to the second load 145. In this connection, the fourth converter 140 includes a DC-AC IGBT type converter, but the present disclosure is not limited thereto.

The fourth converter 140 and the second converter 130 may be connected to an output of the first converter 120 via the bus B1. The bus B1 may perform a function of providing the same power to a plurality of devices as connected in parallel with each other.

In order for first load 135 and second load 145 to operate normally, an electrical potential of the bus B1 must remain constant. To this end, when an error occurs in the first converter 120, the energy storage system 200 may provide power of the battery 220 such that the bus B1 has a constant potential.

Further, the energy storage system 200 may provide additional power or absorb power so that the potential of the bus B1 is kept constant even when the first converter 120 operates normally. However, the present disclosure is not limited thereto.

In FIG. 2, only a single first load 135 and a single second load 145 are electrically connected to the bus B1, but the present disclosure is not limited thereto. A plurality of loads may be connected to the bus B1 for operation of the loads.

FIG. 3 is a block circuit diagram showing an uninterruptible power supply system according to a third embodiment of the present disclosure. For the sake of convenience of the description, a duplicated description with the descriptions of the above-described embodiments will be omitted and differences between the third embodiment and the above-described embodiments will be mainly described.

Referring to FIG. 3, the uninterruptible power supply system according to the third embodiment of the present disclosure includes all of the components of the uninterruptible power supply system as described with reference to FIG. 1, and may have substantially similar operations as those thereof, but further includes a fifth converter 125.

The fifth converter 125 is connected in parallel with the first converter 120 to convert the AC voltage of the grid 110 into a DC voltage. The fifth converter 125 may operate substantially in the same manner as the first converter 120. In this connection, the fifth converter 125 includes a DC-AC diode type diode converter, but the present disclosure is not limited thereto.

The fifth converter 125 may be controlled by the PLC 300. When the first converter 120 is not operating normally, the fifth converter 125 may replace the first converter 12.

For example, when the first converter 120 is not operating normally, the PLC 300 turns off the switches AC_CB2 and DC_CB1 sandwiching the first converter 120 therebetween but turns on the switches AC_CB3 and DC_CB4 sandwiching the fifth converter 125 therebetween to transmit the power of the grid 110 to the node N1.

That is, the fifth converter 125 may operate in place of the first converter 120. Adding the fifth converter 125 may allow the stability of the uninterruptible power supply system to be improved.

FIG. 4 is a block circuit diagram showing an uninterruptible power supply system according to a fourth embodiment of the present disclosure. For the sake of convenience of the description, a duplicated description with the descriptions of the above-described embodiments will be omitted and differences between the fourth embodiment and the above-described embodiments will be mainly described.

Referring to FIG. 4, the uninterruptible power supply system according to the fourth embodiment of the present disclosure includes all of the components of the uninterruptible power supply system as described with reference to FIG. 1, and may have substantially similar operations as those thereof, but further includes a switch module 150.

The switch module 150 is disposed between the second converter 130 and the first load 135. One end of the switch module 150 is connected to the output of the second converter 130. The other end thereof may be connected to the grid 110. In this connection, the switch module 150 may be connected to the first load 135 selectively at either one end or the other end of the switch module 150.

That is, when the uninterruptible power supply system does not normally operate, the switch module 150 may form a bypass path along which the power of the grid 110 may be directly delivered to the first load 135.

The switch module 150 may be controlled by the PLC 300. The PLC 300 may determine whether the bypass path is to be formed via the switch module 150, based on the status information of the first converter 120, the second converter 130, or the energy storage system 200.

For example, when the second converter 130 is not operating normally, the PLC 300 may control the switch module 150 to form the bypass path along which the power of the grid 110 may be directly delivered to the first load 135. However, the present disclosure is not limited thereto.

FIG. 5 is a diagram for describing an operation in a normal mode of an uninterruptible power supply system according to some embodiments of the present disclosure. FIG. 6 is an illustration of an operation in a charge mode of an uninterruptible power supply system according to some embodiments of the present disclosure. FIG. 7 shows an operation in an UPS mode of the uninterruptible power supply system according to some embodiments of the present disclosure.

Referring to FIG. 5, FIG. 5 shows a state in which an uninterruptible power supply system according to some embodiments of the present disclosure operates in a normal mode. In this normal mode, the energy storage system 200 may operate in the above-described stop mode, standby mode, standby mode, or hold mode.

In this case, the AC voltage of the grid 110 may be converted to DC voltage by the first converter 120. Then, the DC voltage as the output of the first converter 120 may be transferred to the second converter 130 where in turn the DC voltage may be converted into the AC voltage which in turn may be transmitted to the first load 135.

In this connection, the energy storage system 200 may be separated from a node N1. Specifically, the energy storage system 200 compares the voltage Vdc of the node N1 with a predetermined limit voltage Vdc_limit. Then when the voltage Vdc of the node N1 is greater than the limit voltage Vdc_limit, the energy storage system 200 is electrically isolated from the node N1. In this case, when the energy storage system 200 receives a charge command from the PLC 300 or when a SOC level of the battery 220 is not a full level, the energy storage system 200 may operate in the charge mode. However, the present disclosure is not limited thereto.

Referring to FIG. 6, FIG. 6 shows a state in which an uninterruptible power supply system according to some embodiments of the present disclosure operates in a charge mode. When the energy storage system 200 receives the charge command from the PLC 300 in the normal mode or checks the SOC level of the battery 220 and then confirms that the battery 220 is not in the fully charged state, the energy storage system 200 may operate in the charge mode.

Further, when the SOC level of the battery 220 is lower than a predetermined SOC minimum level SOC Min of the energy storage system 200, the energy storage system 200 may operate in a charge mode.

When the energy storage system 200 operates in a charge mode, the energy storage system 200 is electrically connected to node N1. In this connection, the third converter 210 may convert the power of the node N1 and deliver the converted power to the battery 220 to charge the battery 220.

When the energy storage system 200 then determines that the SOC level of the battery 220 is higher than a predefined SOC maximum level SOC_Max, the PLC may stop the charge mode.

However, the present disclosure is not limited thereto. A "constant charging scheme" may be used in which the energy storage system 200 operates in the charge mode immediately according to the voltage Vdc of the node N1 irrespective of the SOC level of the battery 220.

Referring to FIG. 7, FIG. 7 shows a state in which an uninterruptible power supply system according to some embodiments of the present disclosure operates in an UPS mode.

In this case, the energy storage system 200 is connected to the node N1, while the first converter 120 is separated from the node N1. Specifically, when an error occurs in the first converter 120 and thus the power of the grid 110 may not be properly transmitted to the node N1, the voltage Vdc of the node N1 becomes low.

In this connection, the energy storage system 200 may operate to maintain the voltage Vdc of node N1 at a certain level. Accordingly, a constant power may be transmitted to the first load 135.

For example, the energy storage system 200 compares the voltage Vdc of the node N1 with a predetermined limit voltage Vdc_limit. When the voltage Vdc of the node N1 is lower than the limit voltage Vdc_limit, the energy storage system 200 is electrically connected to the node N1.

In this connection, the PLC 300 may identify the operating mode of the energy storage system 200. When the operating mode of the energy storage system 200 is the UPS mode, the PLC 300 may turn off the switches AC_CB2 and DC_CB1 sandwiching the first converter 120 therebetween. However, the present disclosure is not limited thereto. The energy storage system 200 may directly turn off the switches AC_CB2 and DC_CB1 sandwiching the first converter 120 therebetween.

This allows the energy storage system 200 to continuously deliver a constant amount of the power to the first load 135.

Hereinafter, the operation algorithm of the uninterruptible power supply system according to some embodiments of the present disclosure will be described in details.

FIG. 8 is a flowchart for describing the operation of an energy storage system included in an uninterruptible power supply system according to one embodiment of the present disclosure.

Referring to FIG. 8, an energy storage system 200 according to one embodiment of the present disclosure compares the voltage Vdc of the node N1 with a predetermined limit voltage Vdc_limit S110.

Subsequently, when the voltage Vdc of the node N1 is lower than the predetermined limit voltage Vdc_limit, the energy storage system 200 operates in an UPS mode S120. A failure of the first converter 120 or instability of the voltage of the grid 110 may contribute to the lowering of the voltage Vdc of the node N1.

In this connection, the energy storage system 200 is electrically connected to the node N1 to control the voltage Vdc at the node N1. Thus, the energy storage system 200 provides the power stored in battery 220 to the first load 135.

Then, the energy storage system 200 transmits a command CMD_UPS to the PLC 300 informing that the UPS 300 operates in the UPS mode. However, the PLC 300 may determine the operating mode of the energy storage system 200 based on the operating states of the first converter 120, the second converter 130, and the third converter 210 before receiving the command CMD_UPS. The command CMD_UPS may be used to check the determination of the PLC 300. Further, the energy storage system 200 may operate while omitting the step S130.

Next, the energy storage system 200 re-compares the voltage Vdc of the node N1 with the predetermined limit voltage Vdc_limit S140.

Then, when the voltage Vdc of the node N1 is still lower than the predetermined limit voltage Vdc_limit, the energy storage system 200 repeats the steps S120 to S140.

To the contrary, when the voltage Vdc of the node N1 is still greater than the predetermined limit voltage Vdc_limit, the control of the voltage Vdc of the node N1 is disabled. The process may return to the standby mode or normal mode S150 and S190.

Alternatively, when the voltage Vdc of the node N1 is greater than the predetermined limit voltage Vdc_limit, the energy storage system 200 operates in a normal mode. In this connection, the energy storage system 200 transmits command CMD_Normal to the PLC 300 informing that the system 200 operates in the normal mode S160. In this connection, the PLC 300 may determine the operating mode of the energy storage system 200 based on the operating states of the first converter 120, the second converter 130 and the third converter 210 before receiving the CMD_Normal command. The command CMD_Normal may be used to check the determination of the PLC 300. Further, the energy storage system 200 may operate while omitting the step S160.

Then, the energy storage system 200 determines whether the SOC level of the battery 220 is lower than the SOC minimum level SOC_Min to determine whether to enter the charge mode S170.

When the SOC level of the battery 220 is greater than the SOC minimum level SOC Min, the energy storage system 200 maintains the normal mode or standby mode S190.

To the contrary, when the SOC level of the battery 220 is lower than the SOC minimum level SOC Min, the energy storage system 200 is switched to the charge mode S175. Specifically, the energy storage system 200 is electrically connected to the node N1 to charge the battery 220. In this connection, the energy storage system 200 may control the current flowing to the battery 220 through the node N1 to charge the battery 220.

Then, the energy storage system 200 determines whether the SOC level of the battery 220 is greater than a SOC maximum level SOC_Max S180.

When the SOC level of the battery 220 is still lower than the SOC maximum level SOC_Max, the step S175 is repeatedly performed.

Otherwise, when the SOC level of the battery 220 is greater than the SOC maximum level SOC_Max, the energy storage system 200 stops the control of the current in the battery 220. The operating mode of the energy storage system 200 is switched to the normal mode or standby mode S185 and S190.

However, the present disclosure is not limited thereto. A "constant charging scheme" may be used in which the energy storage system 200 operates in the charge mode immediately according to the voltage Vdc of the node N1 irrespective of the SOC level of the battery 220.

Thus, the energy storage system 200 included in the uninterruptible power supply system in accordance with the present disclosure does not receive the operation command from the PLC 300, but actively switches the operating mode thereof to provide the uninterruptible power to the load.

That is, the energy storage system 200 in accordance with the present disclosure does not receive the command from the PLC 300 but actively determines whether to enter the UPS mode to supply the uninterruptible power to the load. This may ensure a high response speed in an accident event. Further, exchange of data received from the PLC 300 may be simplified.

In this manner, the operation control algorithm of the uninterruptible power supply system in accordance with the present disclosure is simplified. Accordingly, when the uninterruptible power supply system fails, the response speed of the energy storage system 200 may be improved. Further, the communication error probability may be lowered by mitigating the complexity of the communication connections between the components of the uninterruptible power supply system. Further, the stability of the uninterruptible power supply system may be improved.

FIG. 9 is a flowchart for describing the operation in the normal mode of the PLC included in the uninterruptible power supply system according to one embodiment of the present disclosure.

Referring to FIG. 9, FIG. 9 shows a sequence algorithm of the PLC 300 when the energy storage system 200 included in the uninterruptible power supply system operates in the normal mode.

First, the PLC 300 determines the operating state of the first converter 120 as the AC-DC converter S110. In this connection, the PLC 300 may determine the operating state of the first converter 120 based on the operation data value received from the first converter 120. The operating state of the first converter 120 may be determined to be a normal state or an abnormal state.

When the operating state of the first converter 120 is determined to be an abnormal state, the PLC 300 determines that the energy storage system 200 operates in the UPS mode S115. In this case, the PLC 300 operates using a different sequence algorithm. A detailed description thereof will be given later with reference to FIG. 10.

To the contrary, when the operating state of the first converter 120 is determined to be a normal state, the PLC 300 determines the operating state of the third converter 210 as a DC-DC converter S120.

The PLC 300 may determine the operating state of the third converter 210 based on the operation data value received from the third converter 210. The operating state of the third converter 210 may be determined to be a "in-operation state", a normal state, an abnormal state, or a standby state.

In this connection, the "in-operation state" may refer to a state in which the third converter 210 operates to provide power to the first load 135. In the normal state, the third converter 210 may operate normally. In the standby state, the third converter 210 may be in the standby state. An abnormal state indicates that the third converter 210 fails to operate or performs an abnormal operation. In this connection, the abnormal operation means providing an output that is outside an average output range.

When the operating state of the third converter 210 is the in-operation state, the PLC 300 determines that the energy storage system 200 is operating in the UPS mode S115.

To the contrary, when the operating state of the third converter 210 is the normal state, the abnormal state, or the standby state, the PLC 300 determines whether a charge command has been received from an external source S130.

When the charge command is received from the outside source, the PLC 300 may transmit the received charge command to the energy storage system 200 to instruct the system 200 to operate in the charge mode S125.

To the contrary, when the PLC 300 does not receive the charge command, the PLC 300 determines the operating state of the second converter 130 as the DC-AC converter S140. In this connection, the PLC 300 may determine the operating state of the second converter 130 based on the operation data value received from the second converter 130. The operating state of the second converter 130 may be determined to be a normal state or an abnormal state.

When the operating state of the second converter 130 is determined to be an abnormal state, the PLC 300 stops the uninterruptible power supply system S155. In this connection, stopping the uninterruptible power supply system means connecting the power of the grid 110 to the load 135. In this connection, when the uninterruptible power supply system stops, the grid 110 and load 135 may be electrically connected to each other via a bypass path. However, the present disclosure is not limited thereto.

To the contrary, when the operating state of the second converter 130 is determined to be a normal state, the PLC 300 checks whether a stop command is received from the outside S150. When the stop command is received from the outside, the PLC 300 stops the uninterruptible power supply system S155. To the contrary, when no stop command is received, the PLC 300 repeats the steps S110 to S150.

FIG. 10 is a flowchart for describing the operation of the PLC in the UPS mode included in the uninterruptible power supply system according to one embodiment of the present disclosure. For the sake of convenience of the description, a duplicated description with the descriptions of the above-described embodiments will be omitted and differences between this embodiment and the above-described embodiments will be mainly described.

Referring to FIG. 10, FIG. 10 shows a sequence algorithm of the PLC 300 when the energy storage system 200 included in the uninterruptible power supply system operates in the UPS mode.

First, the PLC 300 determines the operating state of the first converter 120 as an AC-DC converter S210. In this connection, the PLC 300 may determine the operating state of the first converter 120 based on the operation data value received from the first converter 120. The operating state of the first converter 120 may be determined to be a normal state or an abnormal state.

When the operating state of the first converter 120 is determined to be an abnormal state, the PLC 300 resets the first converter 120 S225.

Then, the PLC 300 determines the operating state of the first converter 120 again S230.

When the operating state of the first converter 120 is determined to be the normal state after the resetting of the first converter 120, the PLC 300 determines the current operating mode of the energy storage system 200 as the normal mode S235.

To the contrary, when the operating state of the first converter 120 is determined to be an abnormal state after the resetting of the first converter 120, the PLC 300 determines that the current operating mode of the energy storage system 200 is maintained in the UPS mode. The PLC 300 then determines the operating state of the third converter 210 as a DC-DC converter S240.

When the operating state of the third converter 210 is determined to be an abnormal state, the PLC 300 stops the uninterruptible power supply system S265. In this connection, stopping the uninterruptible power supply system means connecting the power of the grid 110 to the load 135. In this connection, when the uninterruptible power supply system stops, the grid 110 and load 135 may be electrically connected to each other via a bypass path. However, the present disclosure is not limited thereto.

To the contrary, when the operating state of the third converter 210 is determined to be a normal state, the PLC 300 determines the operating state of the second converter 130 as a DC-AC converter S250. In this connection, the PLC 300 may determine the operating state of the second converter 130 based on the operation data value received from the second converter 130.

When the operating state of the second converter 130 is determined to be an abnormal state, the PLC 300 stops the uninterruptible power supply system S265.

To the contrary, when the operating state of the second converter 130 is determined to be a normal state, the PLC 300 checks when a stop command is received from the outside S260. When a stop command is received from the outside, the PLC 300 stops the uninterruptible power supply system S265. To the contrary, when no stop command is received, the PLC 300 repeats the steps S210 to S260.

Thus, the PLC 300 may determine the operating mode of the energy storage system 200 based on the operating state of each component, for example, the first converter 120, second converter 130, and third converter 210 included in the uninterruptible power supply system. In this case, the PLC 300 may control the uninterruptible power supply system without receiving information on the operating mode from the energy storage system 200, thereby reducing the complexity of the communications between the components and the PLC 300. Further, this may prevent the redundant operation in the uninterruptible power supply system according to the operating mode determination.

Thus, in the uninterruptible power supply system in accordance with the present disclosure, the communication error probability may be reduced by reducing the complexity of communication connections between the components. This improves the stability of the uninterruptible power supply system.

Further, in an accident event, a quick response speed is secured. The relationship between control and command may be simplified. System maintenance and management is facilitated to reduce various resources and costs required for managing the system.

FIG. 11 and FIG. 12 are flowcharts for describing an operation of the PLC included in an uninterruptible power supply system according to another embodiment of the present disclosure.

FIG. 11 shows a sequence algorithm of the PLC 300 when the energy storage system 200 included in the uninterruptible power supply system operates in a normal mode. The sequence algorithm of the PLC 300 in FIG. 11 is similar to that as described with reference to FIG. 9. Thus, differences between FIG. 11 and FIG. 9 may be mainly described.

First, the PLC 300 may count the number of times the operating mode of the uninterruptible power supply system changes. That is, the PLC 300 counts the number M_CNT of the mode switching times of the energy storage system 200 and then determines whether the number M_CNT of the mode switching times is greater than a predetermined set value M_CNT Lim S310.

When the number M_CNT of mode switching times is greater than the predetermined setting value M_CNT_Lim, the PLC 300 stops the uninterruptible power supply system S360. In this connection, stopping the uninterruptible power supply system means connecting the power of the grid 110 to the load 135. In this connection, when the uninterruptible power supply system stops, the grid 110 and load 135 may be electrically connected to each other via a bypass path. However, the present disclosure is not limited thereto.

To the contrary, when the number M_CNT of the mode switching times is lower than the predetermined set value M_CNT Lim, the PLC 300 determines the operating state of the first converter 120 as an AC-DC converter S320.

When the operating state of the first converter 120 is determined to be an abnormal state, the PLC 300 determines that the energy storage system 200 is operating in the UPS mode S325. In this case, the PLC 300 operates using a different sequence algorithm. A detailed description thereof will be given later with reference to FIG. 12.

To the contrary, when the operating state of the first converter 120 is determined to be a normal state, the PLC 300 determines the operating state of the third converter 210 as a DC-DC converter S330. In this connection, the operating state of the third converter 210 may be determined to be an in-operation state, a normal state, an abnormal state, or a standby state.

When the operating state of the third converter 210 is the in-operation state, the PLC 300 may instruct the energy storage system 200 to operate in the standby state S335. In this connection, the standby state of the energy storage system 200 may refer to a state in which the energy storage system 200 monitors the voltage at the node N1 between the first converter 120 and the second converter 130 without supplying power to the load and determines, based on the monitoring result, whether to operate in an UPS mode.

Then, when the operating state of the third converter 210 is a normal state, an abnormal state, or a standby state, the PLC 300 determines the operating state of the second converter 130 as a DC-AC converter S340.

When the operating state of the second converter 130 is determined to be an abnormal state, the PLC 300 stops the uninterruptible power supply system.

To the contrary, when the operating state of the second converter 130 is determined to be a normal state, the PLC 300 initializes the number of mode switching times M_CNT M_CNT=0 S350.

Subsequently, the PLC 300 repeats the steps S310 to S350.

FIG. 12 shows a sequence algorithm of the PLC 300 when the energy storage system 200 included in the uninterruptible power supply system operates in an UPS mode.

First, in the UPS mode, the FIG. PLC 300 may count the number of times the operating mode of the uninterruptible power supply system changes. That is, the PLC 300 counts the number M_CNT of the mode switching times of the energy storage system 200, and then determines whether the number M_CNT of the mode switching times is greater than a predetermined set value M_CNT Lim S410.

When the number M_CNT of mode switching times is greater than the predetermined setting value M_CNT_Lim, the PLC 300 stops the uninterruptible power supply system S460.

To the contrary, when the number M_CNT of the mode switching times is lower than the predetermined set value M_CNT Lim, the PLC 300 determines the operating state of the third converter 210 as a DC-DC converter S420.

When the operating state of the third converter 210 is determined to be an abnormal state, the PLC 300 determines that the energy storage system 200 is operating in the normal mode S425. In this case, the PLC 300 operates using the sequence algorithm as described in FIG. 11. Thus, a duplicate description thereof is omitted.

To the contrary, when the operating state of the third converter 210 is determined to be a normal state, the PLC 300 determines the operating state of the first converter 120 as an AC-DC converter S430.

Then, when the operating state of the first converter 120 is a normal state, the PLC 300 determines that the energy storage system 200 is operating in the normal mode S425.

To the contrary, when the operating state of the first converter 120 is an abnormal state, the PLC 300 determines the operating state of the second converter 130 as a DC-AC converter S440.

When the operating state of the second converter 130 is determined to be an abnormal state, the PLC 300 stops the uninterruptible power supply system.

To the contrary, when the operating state of the second converter 130 is determined to be a normal state, the PLC 300 initializes the number of mode switching times M_CNT M_CNT=0 S450. Subsequently, the PLC 300 repeats the steps S410 to S450.

That is, when PLC 300 operates according to the sequence algorithm as described in FIG. 11 and FIG. 12, and in an event of a communication failure in an uninterruptible power supply system or of a simultaneous failure occurrence of a plurality of components (for example, first converter 120 and third converter 210), the operating mode of the energy storage system 200 alternates between the normal mode and UPS mode. In this connection, the PLC 300 counts the number of mode switching times M_CNT so that the system may be stopped in the event of the above failure occurrence.

Thus, the uninterruptible power supply system in accordance with the present disclosure may respond quickly to complex problems in which errors occur simultaneously between a plurality of components. Thus, the stability of the system may be improved.

Further, the uninterruptible power supply system in accordance with the present disclosure may reduce the communication error probability by mitigating the complexity of communication connections between the components thereof. This also improves the stability of the uninterruptible power supply system. Further, maintenance and management of the uninterruptible power supply system is facilitated, thus to reduce various resources and costs required for managing the system.

FIG. 13 is a flowchart for describing the operation algorithm of the DC-DC converter included in the uninterruptible power supply system according to another embodiment of the present disclosure. FIG. 14 is a graph for describing the charging scheme of the battery included in the energy storage system of the uninterruptible power supply system according to another embodiment of the present disclosure.

Referring to FIG. 13, according to another embodiment of the present disclosure, the third converter 210 of the energy storage system 200 operates in a hold mode as a default mode in the energy storage system 200. As described above, the hold mode refers to a state in which the energy storage system 200 is in a standby state while monitoring the voltage of the node N1. In this case, when the voltage at the node N1 decreases, the energy storage system 200 may switch to the UPS mode.

Subsequently, the voltage Vdc of the node N1 is compared with a predetermined limit voltage Vdc_limit S510.

Subsequently, when the voltage Vdc of the node N1 is lower than the predetermined limit voltage Vdc_limit, the third converter 210 determines whether a voltage level Vbat of the battery 220 is greater than a minimum voltage level Vbat_Min S520. For example, the abnormality of the first converter 120 or the non-stability of the voltage of the grid 110 may contribute to the lowering of the voltage Vdc of the node N1.

Subsequently, when the voltage level Vbat of the battery 220 is lower than the minimum voltage level Vbat_Min, this means that the voltage level of the battery 220 is not enough to provide the power to the node N1 or load 135. In this case, the third converter 210 repeats the step S510.

To the contrary, when the voltage level Vbat of the battery 220 is greater than the minimum voltage level Vbat_Min, the third converter 210 operates in an UPS mode to discharge the battery 220 S530. In this connection, the third converter 210 may transmit a command to the PLC 300 informing that the energy storage system 200 is operating in the UPS mode. However, since a response unit time for which the command is transmitted from the third converter 210 to the PLC 300 is longer than a response unit time for the operation of the third converter 210, the third converter 210 may actively operate before receiving the command for the operating mode from the PLC 300.

Then, the third converter 210 calculates an operation time T by sensing the voltage of the node and accumulating a first response unit time for determining the operating mode based on the sensed voltage. In S540, the third converter 210 determines whether the operation time T is greater than a second response unit time (for example, a delay time) for which the PLC 300 updates the command for the operating mode of the third converter 210.

When the operation time T of the third converter 210 in the UPS mode is smaller than the second response unit time (for example, the delay time), the third converter 210 repeats the steps S520 to S540. That is, the third converter 210 may continue to operate in the UPS mode.

To the contrary, when the operation time T of the second converter 210 in the UPS mode is greater than the second response unit time (for example, the delay time), the third converter 210 determines whether a command to operate in the UPS mode has been received from the PLC 300 S550.

When the third converter 210 receives a command to operate in an UPS mode from the PLC 300, the third converter 210 repeats the steps S520 to S550. In this connection, the third converter 210 may continue to operate in an UPS mode.

The step S550 may mean that the PLC 300 forcibly transmits the command to operate in an UPS mode to the third converter 210 when the third converter 210 does not operate in the UPS mode by itself although the voltage Vdc of the node N1 is below the predetermined limit voltage Vdc_limit. In this way, the uninterruptible power supply system in accordance with the present disclosure may implement a secondary safeguard for the uninterruptible power supply.

To the contrary, when the third converter 210 receives a command to operate in a different operating mode than the UPS mode from the PLC 300, the third converter 210 operates in an operating mode as indicated by the command or returns to the step S510 as described above.

To the contrary, when the voltage Vdc of the node N1 is greater than the limit voltage Vdc_limit, the third converter 210 operates in a charge mode that the system 200 charges the battery 220.

Then, the third converter 210 checks the voltage level Vbat of the battery 220, and operates according to a varying scheme according to the voltage level Vbat S570.

Referring to FIG. 14, when the voltage level Vbat of the battery 220 is an over voltage limit (OVL) level, the third converter 210 operates in a hold mode S572.

Otherwise, when the voltage level Vbat of the battery 220 is in a second region (Region 2), that is, when the voltage level Vbat is lower than the OVL level and is greater than a reference voltage level Voltage max, the third converter 210 charges the battery 220 in a CV mode S574.

To the contrary, when the voltage level Vbat of the battery 220 is in a first region (Region 1), that is, is lower than the reference voltage level Voltage max and is greater than an Under Voltage Limit (UVL) level, the third converter 210 charges the battery 220 in a CC mode other than the CV mode S576. In this connection, the CV mode and the CC mode are related to the conventional technology. Thus, the details thereof are omitted.

Further, in FIG. 14, the UVL level is shown as being different from a minimum voltage level Vbat_Min. However, the present disclosure is not limited thereto. In another example, the UVL level and the minimum voltage level Vbat_Min may be the same.

FIG. 15 is a graph for describing a voltage of a node connected to one end of a DC-DC converter included in an uninterruptible power supply system according to another embodiment of the present disclosure.

Referring to FIG. 15, this figure shows change in the voltage Vdc at the node N1 of the uninterruptible power supply system according to another embodiment of the present disclosure.

The third converter 210 in accordance with the present disclosure operates using the algorithm as described with reference to FIG. 10 and FIG. 14. The voltage Vdc of the node N1 is kept higher than the limit voltage Vdc_limit in the normal state.

However, when some of the components included in the uninterruptible power supply system are abnormal or do not operate normally, the voltage Vdc of the node N1 may be lowered.

In this connection, when the voltage Vdc of the node N1 becomes lower than the predetermined limit voltage Vdc_limit, the third converter 210 operates in an UPS mode and thus provides the power stored in the battery 220 to the node N1.

The operation response speed of the third converter 210 corresponds to a region A. The converter 210 may operate at a response speed of about 5 msec or lower.

Then, the third converter 210 operates in the UPS mode until the voltage Vdc of the node N1 becomes higher than the limit voltage Vdc_limit and thus returns to the normal mode. This corresponds to a region B. In the region B, the operation response speed may be lower than about 20 msec, but the present disclosure is not limited thereto.

Thus, the energy storage system 200 included in the uninterruptible power supply system in accordance with the present disclosure may actively switch the operating mode to provide the uninterruptible power to the load, without receiving the operation command from the PLC 300.

That is, the third converter 210 of the energy storage system 200 in accordance with the present disclosure may actively determine whether to operate in the UPS mode to supply the uninterruptible power, without receiving the command from the PLC 300. This may ensure the quick response speed in an accident event. Further, exchange of data received from the PLC 300 may be simplified.

This simplifies the operation control algorithm of the third converter 210 of the uninterruptible power supply system in accordance with the present disclosure. Accordingly, when the uninterruptible power supply system fails, the response speed of the energy storage system 200 may be improved. Further, the communication error probability may be lowered by mitigating the complexity of the communication connections between the components of the uninterruptible power supply system. Thus, the stability of the uninterruptible power supply system may be improved.

FIG. 16 is a flowchart for describing an operation algorithm of a DC-DC converter included in an uninterruptible power supply system according to another embodiment of the present disclosure. For the sake of convenience of the description, the duplicated description with the above descriptions will be omitted and differences therebetween will be mainly described in following descriptions.

Referring to FIG. 16, the operation algorithm of the DC-DC converter included in the uninterruptible power supply system according to another embodiment of the present disclosure is similar to the algorithm as described with reference to FIG. 10.

Specifically, steps S610 to S650 of the algorithm of the uninterruptible power supply system according to some embodiments of the present disclosure may be substantially the same as the steps S510 to S550 of FIG. 10.

However, the algorithm of the uninterruptible power supply system according to some embodiments of the present disclosure is configured such that when the voltage Vdc at node N1 is greater than the limit voltage Vdc_limit S610, it is determined whether a command indicating the charge mode has been received from the PLC 300 or not S660.

When the command indicating the charge mode is not received from the PLC 300, the third converter 210 operates in a hold mode S672.

To the contrary, when the command indicating the charge mode has been received from the PLC 300, the third converter 210 operates in a charge mode that the system 200 charges the battery 220.

Then, the third converter 210 checks the voltage level Vbat of the battery 220 and operates at a scheme varying according to the voltage level Vbat S670.

When the voltage level Vbat of the battery 220 is equal to or lower than the OVL level, the third converter 210 operates in a hold mode S672.

Otherwise, when the voltage level Vbat of the battery 220 is in the second region (Region 2), that is, when the voltage level Vbat is lower than the OVL level and is greater than the reference voltage level Voltage max, the third converter 210 charges the battery 220 in a CV mode S674.

To the contrary, when the voltage level Vbat of the battery 220 is in a first region (Region 1), that is, is lower than the reference voltage level Voltage max and is greater than an Under Voltage Limit (UVL) level, the third converter 210 charges the battery 220 in a CC mode other than the CV mode S676.

Accordingly, in the uninterruptible power supply system in accordance with the present disclosure, the third converter 210 of the energy storage system 200 may actively determine whether to operate in the UPS mode for supplying the uninterruptible power to the load without receiving the command from the PLC 300. This may ensure the quick response speed in an accident event. Further, exchange of data received from the PLC 300 may be simplified.

This simplifies the operation control algorithm of the third converter 210 of the uninterruptible power supply system in accordance with the present disclosure. Accordingly, when the uninterruptible power supply system fails, the response speed of the energy storage system 200 may be improved. Further, the communication error probability may be lowered by mitigating the complexity of the communication connections between the components of the uninterruptible power supply system. Thus, the stability of the uninterruptible power supply system may be improved.

It will be understood by those skilled in the art that various changes in form and details may be made therein without departing from the spirit and scope of the invention as defined by the appended claims. Thus, the present invention as described above is not limited to the above-described embodiments and the accompanying drawings.

What is claimed is:

1. An uninterruptible power supply system connected to a grid, the uninterruptible power supply system comprising:
a first converter configured to convert alternate current (AC) voltage of the grid to direct current (DC) voltage;
a second converter connected in series with the first converter, wherein the second converter is configured to convert the DC voltage output from the first converter to AC voltage and to transmit the AC voltage to a load;
an energy storage system including a battery, wherein the energy storage system is electrically connected to a node between the first converter and the second converter for charging and discharging the node; and
a programmable logic controller (PLC) configured to:
receive operating states of the first and second converters,
control an operation of the uninterruptible power supply system based on the received operating states,
determine an operating mode of the energy storage system based on the received operating states of the first and second converters,
count a number of mode switching times of the energy storage system, and
when the number of mode switching times is greater than a predetermined value, stop the uninterruptible power supply system and connect the grid to the load.

2. The uninterruptible power supply system of claim 1, wherein when the PLC determines that an operating state of the first converter is abnormal, the PLC is configured to determine that the operating mode of the energy storage system is an uninterruptible power supply (UPS) mode, or is configured to switch the operating mode of the energy storage system to the UPS mode, and the PLC is configured to reset the first converter.

3. The uninterruptible power supply system of claim 2, wherein the energy storage system further includes a third converter, wherein the third converter is disposed between and connected to the battery and the node and is configured to vary a magnitude of DC voltage across the third converter, wherein the PLC is configured to:
when the operating state of the first converter is determined to be normal after resetting the first converter, switch the operating mode the energy storage system to a normal mode; or
when the operating state of the first converter is determined to be abnormal after resetting the first converter, switch the operating mode the energy storage system to the UPS mode to monitor operating states of the second and third converters.

4. The uninterruptible power supply system of claim 3, wherein when the PLC determines that an operating state of the third converter is abnormal, the PLC is configured to stop the uninterruptible power supply system, and to connect the grid to the load.

5. The uninterruptible power supply system of claim 1, wherein the energy storage system further includes a third converter, wherein the third converter is disposed between and connected to the battery and the node and is configured to vary a magnitude of DC voltage across the third converter, and wherein the PLC is configured to:
when the operating mode of the energy storage system is a normal mode, and when an operating state of the third converter is an in-operation mode, determine the operating mode of the energy storage system as an uninterruptible power supply (UPS) mode; or
when the operating mode of the energy storage system is a normal mode, and when the operating state of the third converter is determined to be a standby state or an abnormal state, determine the operating mode of the energy storage system as a normal mode.

6. The uninterruptible power supply system of claim 1, wherein when the PLC determines that an operating state of the second converter is abnormal, the PLC is configured to stop the uninterruptible power supply system and connect the grid to the load.

7. An uninterruptible power supply system connected to a grid, the uninterruptible power supply system comprising:
a first converter configured to convert alternate current (AC) voltage of the grid to direct current (DC) voltage;
a second converter connected in series with the first converter, wherein the second converter is configured to convert the DC voltage output from the first converter to AC voltage and to transmit the AC voltage to a load;
a battery electrically connected to a node between the first converter and the second converter for charging and discharging the node;
a third converter disposed between and connected to the battery and the node and configured to vary a magnitude of DC voltage across the third converter,
wherein the third converter is configured to, when a voltage at the node is lower than a predetermined limit voltage, operate in an uninterruptible power supply (UPS) mode to provide power stored in the battery to the node; and
a programmable logic controller (PLC) configured to:
receive information on operating states of the first and second converters;
generate a command indicating an operating mode of the third converter based on the operating states of the first and second converters; and
transmit the generated command to the third converter.

8. The uninterruptible power supply system of claim 7, wherein a first response unit time for which the third converter senses the voltage of the node and determines an operating mode based on the voltage is smaller than a second response unit time for which the PLC updates the command indicating the operating mode of the third converter.

9. The uninterruptible power supply system of claim 8, wherein the third converter is configured to:
calculate an operation time by accumulating the first response unit time; and
when the operation time is smaller than the second response unit time, maintain the operating mode of the third converter.

10. The uninterruptible power supply system of claim 7, wherein when the third converter receives the command indicating the operating mode thereof from the PLC, the third converter is configured to operate in the operating mode indicated by the received command.

11. The uninterruptible power supply system of claim 7, wherein when the voltage at the node is greater than the predetermined limit voltage, the third converter is configured to operate in a mode varying based on a voltage level of the battery.

12. The uninterruptible power supply system of claim 7, wherein when a voltage level of the battery is at a first level as an over voltage limit (OVL) level, the third converter is configured to operate in a hold mode, and
wherein when the voltage level of the battery is lower than the first level, the third converter is configured to operate in a charge mode to charge the battery.

13. The uninterruptible power supply system of claim 12, wherein when the voltage level of the battery is between the first level and a second level lower than the first level, the third converter is configured to charge the battery in a first scheme,
wherein when the voltage level of the battery is between the second level and a third level lower than the second level, the third converter is configured to charge the battery in a second scheme different from the first scheme.

14. The uninterruptible power supply system of claim 7, wherein when a voltage level of the battery is greater than a predetermined minimum battery voltage level, the third converter is configured to operate in the UPS mode.

15. An uninterruptible power supply system connected to a grid, the uninterruptible power supply system comprising:
a first converter configured to convert alternate current (AC) voltage of the grid to direct current (DC) voltage;
a second converter connected in series with the first converter, wherein the second converter is configured to convert the DC voltage output from the first converter to AC voltage and to transmit the AC voltage to a first load; and
an energy storage system including a battery, wherein the energy storage system is electrically connected to a node between the first converter and the second converter for charging and discharging the node,
wherein when a voltage at the node is lower than a predetermined limit voltage, the energy storage system is configured to operate in an uninterruptible power supply (UPS) mode to provide power stored in the battery to the node,
wherein when a voltage level of the battery is at an over voltage limit (OVL) level, the energy storage system is configured to operate in a hold mode, and
wherein when the voltage level of the battery is lower than the OVL level, the energy storage system is configured to operate in a charge mode to charge the battery.

16. The uninterruptible power supply system of claim 15, wherein the uninterruptible power supply system further includes:
a fourth converter connected in parallel with the second converter, wherein the fourth converter is configured to convert the DC voltage output from the first converter to AC voltage and transmit the AC voltage to a second load other than the first load; and
a bus disposed between the first converter and the second and fourth converters, wherein the energy storage system is configured to determine whether to operate in the UPS mode based on a voltage of the bus.

17. The uninterruptible power supply system of claim 15, wherein the uninterruptible power supply system further includes a fifth converter connected in parallel with the first converter and configured to convert AC voltage of the grid to DC voltage, wherein when the first converter is abnormal, the fifth converter is turned on to convert AC voltage of the grid to DC voltage and transfer the DC voltage to the second converter.

18. The uninterruptible power supply system of claim 15, wherein the uninterruptible power supply system further includes a switch module placed between the second converter and the first load, wherein a first end of the switch module is connected to an output of the second converter, wherein a second end of the switch module is connected to the grid, and wherein one of the first end and the second end of the switch module is selectively connected to the first load.

* * * * *